(12) United States Patent
Voynow et al.

(10) Patent No.: US 9,760,920 B2
(45) Date of Patent: Sep. 12, 2017

(54) SYNCHRONIZING DIGITAL CONTENT

(75) Inventors: Gregory I. Voynow, Princeton, NJ (US); Guy A. Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 492 days.

(21) Appl. No.: 13/552,548

(22) Filed: Jul. 18, 2012

(65) Prior Publication Data
US 2013/0073449 A1 Mar. 21, 2013

Related U.S. Application Data

(63) Continuation-in-part of application No. 13/070,313, filed on Mar. 23, 2011.

(51) Int. Cl.
*G06Q 30/06* (2012.01)
(52) U.S. Cl.
CPC ................................ *G06Q 30/0601* (2013.01)
(58) Field of Classification Search
None
See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,208,956 B1 | 3/2001 | Motoyama | |
| 6,260,011 B1 | 7/2001 | Heckerman et al. | |
| 6,356,922 B1 * | 3/2002 | Schilit et al. | 715/236 |

(Continued)

FOREIGN PATENT DOCUMENTS

| | | |
|---|---|---|
| CN | 103988193 A | 8/2014 |
| EP | 2689346 | 1/2014 |

(Continued)

OTHER PUBLICATIONS

International Search Report issued in connection with International Patent Application No. PCTUS12/30186 dated Jun. 20, 2012, 12 pages.

(Continued)

*Primary Examiner* — Hassan Phillips
*Assistant Examiner* — Omeed D Rahgozar
(74) *Attorney, Agent, or Firm* — Knobbe, Martens, Olson & Bear, LLP

(57) ABSTRACT

Aspects of the present disclosure relate to one or more configured computing systems identifying when decoupled content includes a companion content pair (e.g., a first content and a second content) that can be synchronously or interchangeably presented. Further, aspects of the present disclosure relate to notifying a user of the availability of companion content. Notifications can be displayed to a user at any number of notifications triggers that indicate the user may be interested in acquiring companion content. Further, notifications may correspond to an offer to acquire at least a portion of companion content, such as a trial of the companion content. If a user accepts such an offer, synchronization information may be used to begin presentation of the companion content from a last consumed position of a corresponding first content.

27 Claims, 16 Drawing Sheets

(56) References Cited

U.S. PATENT DOCUMENTS

| | | | |
|---|---|---|---|
| 6,766,294 | B2 | 7/2004 | MaGinite et al. |
| 6,912,505 | B2* | 6/2005 | Linden et al. ............. 705/14.53 |
| 7,107,533 | B2 | 9/2006 | Duncan et al. |
| 7,231,351 | B1 | 6/2007 | Griggs |
| 8,106,285 | B2 | 1/2012 | Gerl et al. |
| 8,109,765 | B2 | 2/2012 | Beattie et al. |
| 8,131,545 | B1* | 3/2012 | Moreno et al. ............... 704/235 |
| 8,131,865 | B2 | 3/2012 | Rebaud et al. |
| 8,442,423 | B1 | 5/2013 | Ryan et al. |
| 8,548,618 | B1 | 10/2013 | Story, Jr. et al. |
| 8,577,668 | B2 | 11/2013 | Rosart et al. |
| 8,948,892 | B2 | 2/2015 | Story, Jr. et al. |
| 2002/0002459 | A1 | 1/2002 | Lewis et al. |
| 2002/0007349 | A1* | 1/2002 | Yuen .............................. 705/52 |
| 2002/0041692 | A1 | 4/2002 | Seto et al. |
| 2002/0116188 | A1 | 8/2002 | Amir et al. |
| 2003/0061028 | A1* | 3/2003 | Dey et al. .......................... 704/9 |
| 2003/0083885 | A1 | 5/2003 | Frimpong-Ansah |
| 2003/0115289 | A1 | 6/2003 | Chinn et al. |
| 2004/0261093 | A1* | 12/2004 | Rebaud et al. ................. 725/25 |
| 2006/0148569 | A1 | 7/2006 | Beck |
| 2007/0016314 | A1 | 1/2007 | Chan et al. |
| 2007/0061487 | A1 | 3/2007 | Moore et al. |
| 2007/0136459 | A1* | 6/2007 | Roche et al. ................. 709/224 |
| 2008/0177822 | A1 | 7/2008 | Yoneda |
| 2008/0294453 | A1* | 11/2008 | Baird-Smith et al. ............ 705/1 |
| 2009/0047003 | A1 | 2/2009 | Yamamoto |
| 2009/0136213 | A1 | 5/2009 | Calisa et al. |
| 2009/0222520 | A1 | 9/2009 | Sloo et al. |
| 2009/0228570 | A1 | 9/2009 | Janik et al. |
| 2009/0233705 | A1 | 9/2009 | Lemay et al. |
| 2009/0305203 | A1 | 12/2009 | Okumura et al. |
| 2009/0319273 | A1 | 12/2009 | Mitsui et al. |
| 2010/0042682 | A1 | 2/2010 | Kaye |
| 2010/0042702 | A1 | 2/2010 | Hanses |
| 2010/0064218 | A1 | 3/2010 | Bull et al. |
| 2010/0070575 | A1 | 3/2010 | Bergquist et al. |
| 2010/0225809 | A1 | 9/2010 | Connors et al. |
| 2010/0286979 | A1* | 11/2010 | Zangvil et al. ................... 704/9 |
| 2010/0287256 | A1 | 11/2010 | Neilio |
| 2011/0067082 | A1 | 3/2011 | Walker |
| 2011/0087802 | A1 | 4/2011 | Witriol et al. |
| 2011/0119572 | A1 | 5/2011 | Jang et al. |
| 2011/0231474 | A1* | 9/2011 | Locker et al. ................. 709/203 |
| 2011/0246175 | A1 | 10/2011 | Yi et al. |
| 2011/0288861 | A1 | 11/2011 | Kurzweil et al. |
| 2011/0288862 | A1 | 11/2011 | Todic |
| 2011/0296287 | A1 | 12/2011 | Shahraray et al. |
| 2012/0030288 | A1 | 2/2012 | Burckart et al. |
| 2012/0109640 | A1 | 5/2012 | Anisimovich et al. |
| 2012/0150935 | A1 | 6/2012 | Frick et al. |
| 2012/0166180 | A1* | 6/2012 | Au ..................................... 704/9 |
| 2012/0197998 | A1 | 8/2012 | Kessel et al. |
| 2012/0245719 | A1 | 9/2012 | Story, Jr. et al. |
| 2012/0245720 | A1 | 9/2012 | Story, Jr. et al. |
| 2012/0245721 | A1 | 9/2012 | Story, Jr. et al. |
| 2012/0246343 | A1 | 9/2012 | Story, Jr. et al. |
| 2012/0315009 | A1 | 12/2012 | Evans et al. |
| 2012/0324324 | A1 | 12/2012 | Hwang et al. |
| 2013/0041747 | A1 | 2/2013 | Anderson et al. |
| 2013/0073675 | A1 | 3/2013 | Hwang et al. |
| 2013/0074133 | A1 | 3/2013 | Hwang et al. |
| 2013/0257871 | A1 | 10/2013 | Goldstein et al. |
| 2013/0262127 | A1 | 10/2013 | Goldstein et al. |
| 2014/0005814 | A1 | 1/2014 | Hwang et al. |
| 2014/0039887 | A1 | 1/2014 | Dzik et al. |
| 2014/0040713 | A1 | 2/2014 | Dzik et al. |
| 2014/0223272 | A1 | 8/2014 | Arora et al. |
| 2015/0026577 | A1 | 1/2015 | Story et al. |

FOREIGN PATENT DOCUMENTS

| | | |
|---|---|---|
| JP | 2002-140085 | 5/2002 |
| JP | 2005-189454 | 7/2005 |
| NZ | 532174 | 1/2007 |
| WO | WO 2006/029458 A1 | 3/2006 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

International Search Report and Written Opinion in PCT/US2013/042903 dated Feb. 7, 2014.
International Search Report issued in connection with International Application No. PCT/US13/53020 dated Dec. 16, 2013.
Office Action in Japanese Application No. 2014-501257 dated Aug. 25, 2014.
International Search Report and Written Opinion in PCT/US2014/014508 dated Jun. 25, 2014.
Arar, Y., Blio E-Book Platform: No Reader (Yet), But Great Graphics, Jan. 7, 2010.
Beattie, V., et al., Reading Assistant: Technology for Guided Oral Reading, Scientific Learning, Apr. 10, 2012, 5 pages.
Dzik, S.C., U.S. Appl. No. 13/604,482, filed Sep. 5, 2012, entitled Identifying Corresponding Regions of Content.
Dzik, S.C., U.S. Appl. No. 13/604,486, filed Sep. 5, 2012, entitled Selecting Content Portions for Alignment.
Dzik, S.C., U.S. Appl. No. 13/662,306, filed Oct. 26, 2012, entitled Content Presentation Analysis.
Feature: Synched Audio and Text, Enhanced Editions, Aug. 31, 2009, last accessed Nov. 15, 2012, available at http://www.enhanced-editions.com/blog/2009/08/enhanced-editions-features-exclusive-soundtracks-and-extracts/.
Hwang, D.C., et al., U.S. Appl. No. 13/536,711, filed Jun. 28, 2012, entitled Pacing Content.
International Search Report issued in connection with International Patent Application No. PCT/US12/30198 dated Jun. 20, 2012, 16 pages.
Levinson, S.E., et al., Continuous Speech Recognition from a Phonetic Transcription, Acoustics, Speech, and Signal Processing, Apr. 1990, pp. 190-199.
Roub, P., I'll Buy an E-book Reader When . . . , Nov. 16, 2007, available at: http://roub.net/blahg/2007/11/16/ill-buy-an-eboo/ (accessed Sep. 6, 2012), 2 pages.
Vignoli, F., et al., A Text-Speech Synchronization Technique With Applications to Talking Heads, Auditory-Visual Speech Processing, ISCA Archive, Aug. 7-10, 1999.
Weber, F.V., U.S. Appl. No. 13/531,376, filed Jun. 22, 2012, entitled Modelling Expected Errors for Discriminative Training.
Extended Search Report in European Application No. (12761404.8) dated Jan. 26, 2015.
International Preliminary Report issued in connection with International Application No. PCT/US13/53020 dated Feb. 12, 2015.
U.S. Appl. No. 13/070,313, Synchronizing Digital Content, filed Mar. 23, 2011.
U.S. Appl. No. 13/535,240, Managing Related Digital Content, filed Jun. 27, 2012.
U.S. Appl. No. 13/535,264, Managing Related Digital Content, filed Jun. 27, 2012.
U.S. Appl. No. 13/602,012, Synchronized Digital Content Samples, filed Aug. 31, 2012.
U.S. Appl. No. 13/570,179, Synchronizing Recorded Audio Content and Companion Content, filed Aug. 8, 2012.
U.S. Appl. No. 13/070,422, Managing Playback of Synchronized Content, filed Mar. 23, 2011.
U.S. Appl. No. 13/070,421, Managing Playback of Synchronized Content, filed Mar. 23, 2011.
U.S. Appl. No. 13/070,439, Managing Playback of Synchronized Content, filed Mar. 23, 2011.
U.S. Appl. No. 13/483,883, Synchronizing Translated Digital Content, filed May 30, 2012.

(56) References Cited

OTHER PUBLICATIONS

U.S. Appl. No. 13/604,482, Identifying Corresponding Regions of Content, filed Sep. 5, 2012.
U.S. Appl. No. 13/604,486, Selecting Content Portions for Alignment, filed Sep. 5, 2012.
U.S. Appl. No. 13/758,749, Selective Synchronous Presentation, filed Feb. 4, 2013.

* cited by examiner

SYNCHRONIZING DIGITAL CONTENT

CROSS-REFERENCE TO RELATED APPLICATIONS

This application is a continuation-in-part of U.S. patent application Ser. No. 13/070,313, filed Mar. 23, 2011, the priority of the filing date of which is hereby claimed under 35 U.S.C. §120, and the entire disclosure of which is incorporated herein by reference.

BACKGROUND

Generally described, computing devices and communication networks facilitate the collection and exchange of information. In a common application, computing devices, such as personal computing devices, can utilize a wide area communication network, generally referred to as the Internet, to access content or other data from other computing devices associated with content providing entities. The specific design/function of each computing device can vary the type of content exchanged between the computing devices.

Users can request data from a content providing entity so that the content is delivered to one or more computing devices in a relatively "real time" basis. For example, users can request content from a network resource (e.g., a Web site, Web service, or cloud node) for immediate presentation on a computing device display screen, or they can request the immediate transfer of content, such as a document or data file, from a network resource or Web service for storage on the computing device. In another example, users can transmit a request, or initiate a transaction, that results in the downloading or streaming of content to a computing device. Typically, the content providing entity would initiate the transfer upon receipt of the request from the computing device.

In some instances, limited portions of electronic content, such as an electronic book ("e-book") or an audio book, may be provided to customers as a sample of the complete content. Acquisition of a content sample may be associated with lower requirements than acquisition of the corresponding complete content. For example, a content sample may be provided free of charge. As such, content samples may enable a customer to better assess whether to acquire the complete content.

In one application, various computing devices associated with a user or a user account have access to different representations of companion content. For example, a user may utilize a computing device such as an e-book reader that has obtained a digital representation of content (e.g., an e-book) or other digital publication that can be presented on an e-book reader via a communication network (e.g., a wireless communication network). This content may be referred to as a "first" content. The same user may also utilize a computing device such as a laptop that has obtained a separate companion representation of the same or similar content (e.g., an audio book that can be audibly presented via headphones/speakers and that corresponds to the e-book obtained by the user's e-book reader). This content may be referred to as a "second" content. The second content may be obtained at a different time and/or from a different source than the first content. As a result, the first content and the second content can be decoupled from one another, and additional features related to the synergy of the first content and the second content (collectively, the "companion content") are not readily available to computing devices utilized by the user or associated with the user's account maintained by a content provider.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
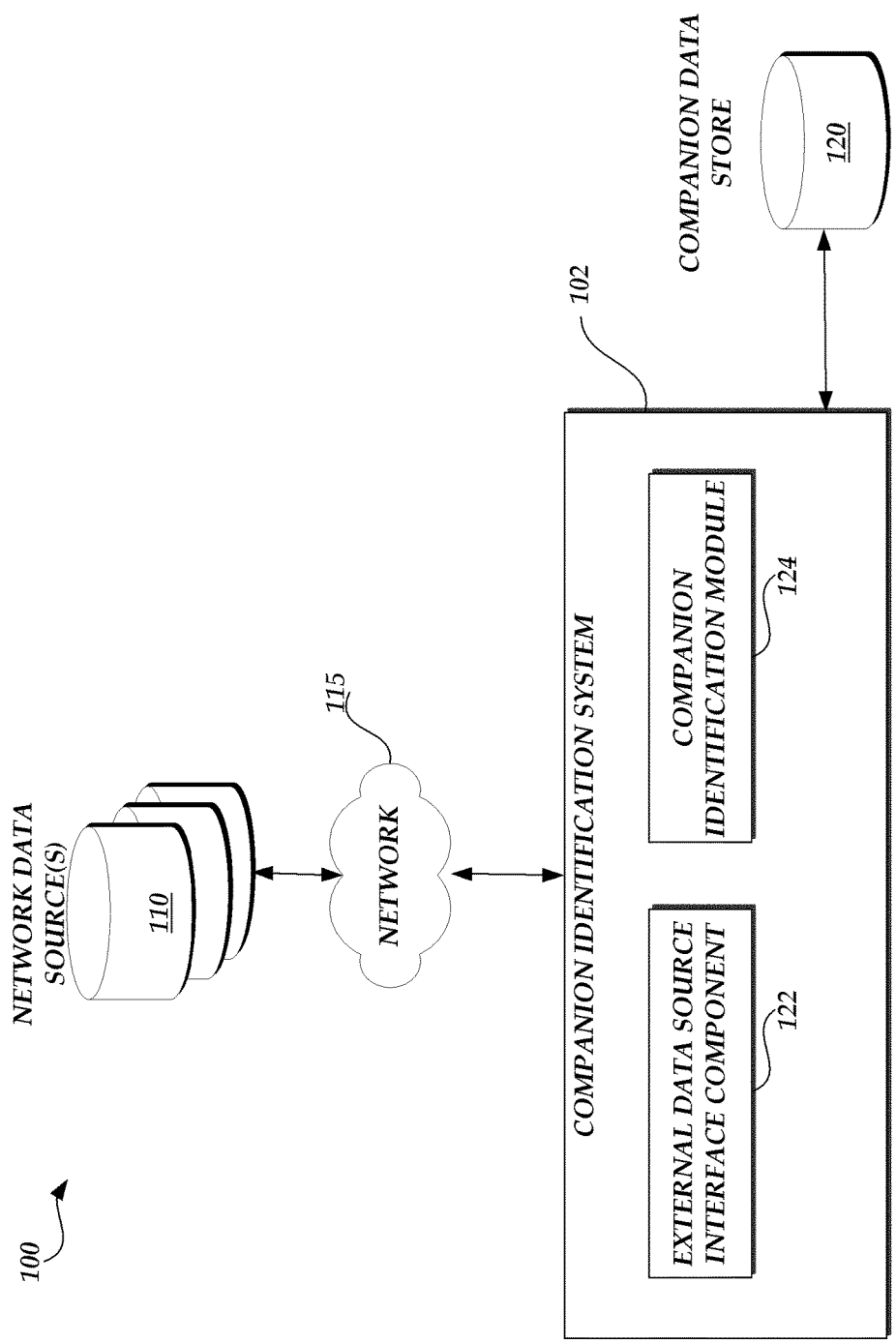
FIG. 1 is a block diagram depicting an illustrative companion identification environment for use in identifying companion content that can be synchronously presented.

Generally described, aspects of the present disclosure relate to the management of content and/or information related to the content. Specifically, aspects of the present disclosure relate to managing decoupled companion content so that it can be synchronized, and to notifying users regarding the availability of such content. Further, aspects of the present disclosure relate to determining notification triggers for the presentation of content notifications to users. Notification triggers may generally refer to any action or event, series of actions or events, or user context that indicates a user may be interested in receiving a notification of the availability of content. While the disclosure may focus on examples of synchronously presenting content for illustrative purposes, the principles and advantages described herein may be applied to other ways of synchronizing content. Content can refer to any data that can be directly or indirectly accessed by a user, including, but not limited to, multi-media data, digital images, digital video, displayable text, audio data, electronic documents, electronic publications/books, computer-executable code, portions of the above, and the like.

A first content and a second content that can be synchronized may be referred to as companion content or a companion content pair. For each pair of companion content, content synchronization information associated with the companion content can be generated, transmitted, and/or obtained via computing devices in a communication network. The content synchronization information can include any data related to the synchronous presentation of the first content and the second content, so as to enable one or more computing devices to synchronously present the companion content. Content synchronization information can include reference points mapping portions of the first content to corresponding portions of the second content. In a specific example, content synchronization information can include data that can be used to map a segment of text (e.g., a word, line, sentence, etc.) to a timestamp of a corresponding audio recording. The content synchronization information can also include information related to the relative progress of the presentation, or a state of presentation of the digital representation of the content. The synchronous presentation of the companion content can vary as a function of the capabilities and/or configuration of the device (e.g., a portable e-book reader vs. a mobile phone) and/or the formats of the content in a companion content pair (e.g., a digital publication and an audio recording vs. a video and an audio recoding). Accordingly, the content synchronization information can be generated in a variety of formats, versions, etc. Moreover, the content synchronization information can include a match score and/or a passage mismatch score, as will be described in more detail below, which can be used for synchronously presenting content. In addition, the content synchronization information can include any combination of features or data used to synchronize content in U.S. patent application Ser. No. 12/273,473 ("the '473 Application"), filed Nov. 18, 2008, entitled "SYNCHRONIZATION OF DIGITAL CONTENT," which is hereby incorporated by reference in its entirety.

However, the first and second content in a companion content pair may be decoupled from each other. Companion content may be decoupled from each other, for example, by being stored on separate computing devices, by being stored in separate data stores that are not part of the same logical memory, by being obtained via different or separate transactions, by being obtained at different times, by being obtained from different sources, or any combination thereof. For instance, a user can buy an e-book and then at a later point in time purchase an audio book version of the e-book from a different vendor. In such cases, the user may wish to listen to the audio book while simultaneously reading the e-book. However, when such companion content is decoupled, it can be difficult to provide the user with a synchronous presentation experience, such as presenting portions of the audio book corresponding to text of the e-book presented on a display.

The decoupled nature of companion content can result in a number of difficulties for providing a user with a synchronous presentation experience. Such difficulties may include, for example, determining sources from which to obtain content information identifying the content, identifying that a second content matches or is a companion to a first content, generating content synchronization information needed to synchronize presentation of the first and second content, providing content synchronization information to a computing device with access to the first and/or second content, managing the storage of information related to the first and/or second content, or any combination thereof.

Further, the nature of decoupled content may result in difficulties in notifying a user of the availability of an item of companion content. For example, a user may own an e-book of *The Adventures of Tom Sawyer*. A corresponding audio book version of *The Adventures of Tom Sawyer* may also be available. However, the audio book may be published at a different time than the e-book, made available through a different source (e.g., a different retailer or content provider), or otherwise decoupled, as described above. As such, the user may be unaware of the existence of the audio book. Further, the user may be unaware that synchronized playback of the e-book and audio book is possible. Accordingly, a user may benefit from notifications as to the availability of companion content for synchronous playback. In general, a user may prefer to opt-in to such notifications, such that notifications are only received if desired. Further, notifications may be provided to a user on an intelligent basis, such as based on the user's current context (e.g., location, time of day, or other metrics related to the state of the user) or a user's preferences.

Accordingly, aspects of the present disclosure will first be described with respect to identifying companion content pairs (e.g., a first content and a corresponding second content), and enabling synchronous playback of the companion content pair. Thereafter, aspects of the present disclosure will be described with respect to notifying a user or users as to the availability of companion content.

With respect to the general identification and presentation of companion content pairs, since the first content and the second content of a companion content pair may be decoupled from each other, one or more computing devices may identify a content match, which indicates that the second content may be a companion of the first content. In embodiments in which the user already has access to the first content and the second content, the one or more computing devices can also identify that the user has such access. Based on determining the content match, the one or more computing devices can identify a receiving computing device associated with the user, and cause transmission of content synchronization information related to the companion content to the receiving computing device. Thereafter, the receiving computing device can utilize the content synchronization information to synchronously or simultaneously present the companion content to the user. Those skilled in the art will appreciate that more than one individual content may match or be a companion to another content. Accordingly, more than two individual contents may be synchronously presented without departing from the scope of the present disclosure. In addition, in some embodiments, one or more receiving computing devices associated with one or more users may receive the content synchronization information and utilize the content synchronization information to synchronously present the companion content.

As an illustrative, non-limiting example, a user may obtain access to companion content (e.g., an e-book formatted for an e-book reader, an audio book, and an e-book formatted for a mobile phone) that can be synchronously presented. More specifically, the user may initially obtain a first content, such as an e-book of *The Adventures of Tom Sawyer*, and store the e-book on the user's e-book reader. In some instances, the audio book of *The Adventures of Tom Sawyer* may become available after the user obtains the first content. Yet, in other instances, the audio book of *The Adventures of Tom Sawyer* may already be available when the user obtains the first content. The user may then obtain this second content, i.e., the audio book of *The Adventures of Tom Sawyer*, via a separate transaction, which can include purchasing, lending, sharing, transferring, or any combination thereof. The separate transaction may be a purchase transaction resulting from a message that the audio book has become available or from browsing a catalog of available audio books. As will be described below, in some embodiments, the user may obtain the second content (or a trial thereof) in response to a notification that the second content is available. After the audio book and the e-book are obtained, the user may desire to synchronously listen to the audio book while viewing the e-book.

In this regard, a content management system can identify that the first content and the second content are a content match, based on determining that the first and second content are companion content. The content management system may be implemented by one or more computing devices, which may, in some instances, include any computing device(s) associated with the user. The content information may be obtained, for example, from network resources, such as an external data source that includes purchase information associated with a user or user account, and/or from information the user shares from a computing device, such a list of content available to the computing device.

In addition to identifying a content match, the content management system can also identify a computing device associated with the user that can synchronously present the first and second content, such as the e-book reader or another computing device. A particular version of the content synchronization information may be transmitted to the identified device in order to be compatible with the companion content that is presented using the identified computing device and/or be compatible with identified computing device itself. For example, a different version of content synchronization information may be provided to an e-book reader versus a mobile phone, based on different formats used to visually present the text of an e-book. The identified computing device may already store the companion content or the content management system may cause at least a portion of the companion content to be transmitted to the identified computing device. The content management system can also cause content synchronization information to be transmitted to the identified device.

With the companion content and the content synchronization information available to the same computing device, the computing device can synchronously present the companion content to provide the user with an enhanced content consumption experience. For instance, the user may listen to the audio book of *The Adventures of Tom Sawyer* while viewing the corresponding text of the e-book, which text can be highlighted, underlined, or otherwise enhanced to correspond to the playback of the audio book. The synchronous presentation experience may also include, for example, automatic page turning synchronized with audio playback and/or aligning search results in one format with a presentation position of the other format, with subsequent synchronous presentation starting at the search result position. Further, though examples may be described with respect to simultaneous output of companion content, synchronized playback may also include interchangeable playback of a synchronized first content and second content. For example, content synchronization information can be used to switch back and forth between presenting a first content and a second content. More specifically, in some implementations, a computing device can display the text of an e-book and then switch to playing the audio of an audio book at a corresponding position using the content synchronization information, or vice versa.

As described above, in some embodiments, the decoupled nature of companion content may present difficulties in notifying a user that companion content exists. For example, a user may purchase a first content of a companion content pair, but not be aware that a corresponding second content is also available. Moreover, even if the user is aware both the first content and second content are available, the user may not be aware that the companion content pair can be synchronously presented. As such, the user of a first content may benefit by being notified that a corresponding second content exists, and may be synchronously presented. Further, a user may not immediately recognize the potential benefits of synchronous presentation. As such, a notification may, in some embodiments, include an offer to acquire a portion of the second content (e.g., a trial portion). This portion of the second content may be offered at a reduced cost, or may be offered free of charge. In some embodiments a cost associated with acquisition of a portion of the second content may be dependent on the user's position within the first content. For example, a user may consume 85% of *The Adventures of Tom Sawyer* e-book without acquiring any portion of a corresponding audio book. A user may be notified that such an audio book exists, and provided with an offer to acquire only the portion of the audio book corresponding to the unconsumed portion of the e-book. Illustratively, the user may be offered the portion of the audio content corresponding to the last 15% of the e-book, at an 85% reduced cost. As will be appreciated by one skilled in the art, offers to acquire companion content may be associated with a variety of pricing models or mechanisms, as will be discussed in more detail below.

In some embodiments, notifications may be provided based on a variety of notification triggers. Generally, a notification trigger may refer to any action or event, series of actions or events, or user context that indicates a user may desire to be notified that companion content is available. For example, a user may have acquired an e-book of *The Adventures of Tom Sawyer*, but may have not acquired the corresponding audio book. As such, the user may read the e-book (e.g., via an e-book reader, or via an e-book reader application) for a threshold amount of time. Thereafter, the user may, within a predefined period of time, halt consumption of *The Adventures of Tom Sawyer* e-book and begin consumption of an unrelated audio book (e.g., *Anna Karenina*). The user may alter the format of consumption of content from a visual (e.g., text) medium to an audio medium for any number of reasons. For example, the user's eyes may be otherwise occupied (e.g., while walking, driving, etc.), the user may be tired (and find it easier to listen to content than to read it), or the user's current lighting conditions may not easily facilitate reading. One skilled in the art will appreciate that a user may switch between consumption formats for any number of reasons. Because the user had previously been reading *The Adventures of Tom Sawyer* e-book, it may be that the user would prefer to continue consuming this content, but is unable or unwilling to (e.g., for any of the reasons described above). As such, the user may have instead chosen to listen to the unrelated audio book. In accordance with aspects of the present disclosure, the user may therefore be notified that an audio book of *The Adventures of Tom Sawyer* is available, and may be synchronously presented with the e-book version of *The Adventures of Tom Sawyer*. Beneficially, this may enable the user to continue consuming *The Adventures of Tom Sawyer*, despite the difficulties which initially prompted a shift to consuming audio content.

Though a single example of a notification trigger is given above, any number of actions or events may indicate that a user may desire to be notified as to the existence of companion content. For example, a user may consume text content on a first device, and thereafter enter a car capable of outputting only audio content. As such, the user may wish to be notified that a text content the user was previously consuming is also available in audio format. As a further example, a user's device may be capable of automatically modifying content from a first format to a second format (e.g., via an automated text-to-speech process). A user activation of such a feature may indicate a desire to consume content in the second format. However, the automatic modification of content may produce less than optimal results. For example, the text-to-speech conversion process may result in unnatural sounding audio. As such, the user may be notified that their consumed content exists natively within the second format (e.g., as a professionally narrated audio book).

Moreover, notification triggers may include context information regarding a user or their surroundings. For example, a notification trigger may include an assessment of the rate of consumption of content. Illustratively, the trigger may correspond to monitoring how quickly "pages" within an e-book are consumed. A reduced speed of consumption may correspond to a high likelihood that the user would like to be notified that a corresponding audio book exists. Further notification triggers include, but are not limited to: other assessments of the consumption of content (e.g., a very high volume or font size); an assessment of external conditions (e.g., a low light source or high amount of external noise); the state of a user's device (e.g., headphones or speaker available, amount of battery available to power a screen or speakers, etc.). In some embodiments, notification triggers may include or be modified by additional information regarding a user. For example, a user's location may indicate whether notifications are desired. Illustratively, a user may not desire to be notified of companion content while they are at work or otherwise occupied. As a further example, a user may only desire to be notified between certain hours of the day (e.g., notifications may not be desirable very late at night).

In some embodiments, information regarding a user or their context may be gathered from additional data sources. For example, in some embodiments, a user may allow notification triggers to be modified based on a shared calendar resource, such as a user's electronic calendar. Illustratively, this may prevent notifications at times in which the user is unavailable or has limited availability.

In still more embodiments, notification triggers may be based at least in part on secondary information regarding a user, such as the user's purchase history, a user's interaction with previous notifications, or demographic data regarding a user. For example, a user with a high number of historical audio book purchases may be more likely to respond positively to a notification that audio book content corresponding to a base content exists. As a further example, a user with little or no previous audio book purchases may not be aware that content in audio format is available, and so may benefit from a notification. In some embodiments, a user's purchase history over time may be analyzed to determine a purchase rate or velocity. For example, a user that purchased a high number of e-books in the past, but has recently purchased little or no e-books may have a declining e-book purchase velocity. As such, a notification may be triggered in order to attempt to regain the patronage of the user. Further, a user's interaction with previous notifications may be used to determine whether a notification trigger has occurred. For example, where a user has consistently declined offers within a specific type of notification trigger, that notification trigger may be less likely to occur in the future. Conversely, where a user has consistently accepted offers presented based on a specific type of notification trigger, that notification trigger may be more likely to occur. Still further, demographic data regarding a user may be used to determine or modify notification triggers. For example, a user's age, location, gender, income, profession, or other information may (with the consent of the user) be compared against demographic information of other users to estimate the user's response to a notification trigger. Illustratively, users between the ages of 18 and 30 may consistently decline offers transmitted in response to a given notification trigger. As such, users between 18 and 30 may be less likely to receive offers in response to the given notification trigger. Though illustrative examples of secondary information regarding a user have been described above, secondary information may include any information regarding a user that may reflect the user's desire to receive notifications as to the availability of companion content.

With reference now to FIG. 1, a block diagram depicting an illustrative companion identification environment 100 for use in identifying content that can be synchronized will be described. As illustrated in FIG. 1, the companion identification environment 100 includes a companion identification system 102 for obtaining content information and/or content synchronization information transmitted from one or more network data sources 110 via a network 115, such as the Internet or other communications link. Any of the networks described herein may be any wired network, wireless network or combination thereof. In addition, any of the networks described herein may be a personal area network, local area network, wide area network, cable network, satellite network, cellular telephone network, etc., or any combination thereof. Additionally, the companion identification system 102 can store content information and/or companion content information in an electronic companion data store 120.

As illustrated in FIG. 1, the content identification system 102 can include an external data source interface component 122 for obtaining content information from network-based resources. The content information can be any information from which content can be identified, such as information corresponding to an identifier, title, format, version, content data itself, and/or other information associated with content. The external data source interface component 122 may also be utilized to cause the transmission of information to the one or more network data sources 110 and/or to a content management system, for example, as described in reference to FIG. 2.

The content identification system 102 can also include a companion identification module 124 for processing the content information from the network data sources 110 and determining which contents are companion content that can be synchronized. The companion identification module 124 may use a product identifier and/or metadata (e.g., title, author, edition, etc.) related to the content can be used to identify companion content. For instance, such information can be used to determine that different formats/versions of the same or similar content, such as *The Adventures of Tom Sawyer* e-book and *The Adventures of Tom Sawyer* audio book, are companion content. In some implementations, the companion identification module 124 may further process the content information to identify companion content by applying filtering, spell/grammar check, and any other suitable automated algorithms. In addition, the companion identification module 124 can incorporate additional reference materials to identify a content match, for instance, by accessing a uniform resource identifier. Further, the content identification module 124 may compare pairs or other combinations of content to determine whether each pair/combination is companion content, for example, by correlating each pair/combination of content in a common format. More specifically, if the content information corresponds to information related to the presentation of a specific representation of content (e.g., an audio book), the companion identification module 124 may translate at least a portion of the content into a format corresponding to a different version of the content (e.g., translating audio into a specific e-book format) and/or into a generic format (e.g., text). The translated content information can be correlated with other content information to determine whether each pair of content is companion content that can be synchronized. In other implementations, the companion identification module 102 may prompt a user to enter data (e.g., title, author, edition, etc.) for one or more contents. The companion identification module 124 may compare the data in order to identify companion content. In yet other implementations, the companion identification module 124 may prompt a user to confirm that the first and second content are companion content.

Those skilled in the art will appreciate that even though a first content and a second content may be companion content, the first content may not correlate exactly to the second content. For example, the audio book of *The Adventures of Tom Sawyer* may not exhibit a one-to-one correspondence to the e-book of *The Adventures of Tom Sawyer* due to differences between the narration script of the audio book and the text of the e-book, differences between editions, differences in "front matter" (e.g., introduction to the audio production, table of contents, index, etc.) and/or "back matter," differences between unabridged and abridged versions, differences in format of content, differences in device capabilities, etc. Due to the existence of such uncorrelated portions of potential companion content, the companion identification module 124 can be configured to identify companion content amongst pairs/combination of content that include mismatching portions. Although more detail will be provided below with reference to correlating portions of an unabridged version of an e-book with an abridged version of the corresponding audio book, the concepts described may be applied to any application in which a first and second content include mismatching portions.

As noted above, when correlating an unabridged version of an e-book with an abridged version of the corresponding audio book, mismatches can result from a number of sources, such as deletions, modifications, insertion of new material, or any combination thereof. Yet the abridged version of the e-book may include large portions of unmodified material, which may strongly correlate with the abridged version of the audio book. Accordingly, in some embodiments, the companion identification module 124 may detect mismatches between an abridged version and an unabridged version of content using algorithms that solve "longest common sequence" problems, an implementation of which can be found, for example, in the UNIX "diff" operation. The companion identification module 124 can then generate content synchronization information for the correlated portions of the different versions and provide the content synchronization information to the user's computing device for use when synchronizing presentation of the abridged audio book with the unabridged e-book. More specifically, the companion identification module 124 can correlate unmodified material similarly to how a full book and a full audio book are correlated. However, for passages of an abridged version with small-scale modifications, the companion identification module 124 may correlate the modified material and generate an indicator that these portions include some mismatches. Although new and deleted material in the abridged version may not correlate with the full version, these uncorrelated passages and modified material can be handled so as to provide the most useful and natural user experience. This may include disabling a subset of synchronous presentation features and/or providing an indication of small scale mismatches. As a non-limiting example, when a user listens to the abridged audio book while viewing the unabridged e-book with synchronized highlighting of text, small scale modifications may be highlighted differently to indicate that audio playback does not completely match the written text. Similar techniques can be applied when correlating an unabridged audio book with a companion unabridged e-book, as some material may not match between these versions.

An illustrative method that can be implemented by the companion identification module 124 for processing mismatches will now be described in general terms. First, potential companion content can be converted into a common format, such as text and/or phoneme. Then an attempt is made to match content at a small scale (e.g., at a word level) can be performed. Since missing or added passages can include larger portions (e.g., whole sentences or paragraphs) that do not match, a passage mismatch score indicating the frequency of mismatches can be computed for sentences, paragraphs, and/or other units of text. For example, the passage mismatch score may represent a number and/or percentage of word mismatches for a larger portion of text (e.g., a sentence, paragraph, or page). Sequences of larger portions with similarly high mismatch frequencies compared with adjoining sequences (where "high" can be set empirically from analyzing correlation of known companion content) can be identified. These sequences may represent content that should not be synchronized with other content in a companion content pair. The high mismatch passages can be removed in either or both contents, and matching can be reattempted at a smaller scale (e.g., at the word level). Metadata can be generated based on the correlation(s) to determine alignment points for the content synchronization information. The metadata may also include information identifying reference points in at least one of the companion content at which a matching portion begins/ends.

The content identification module 124 can also cause a notification to be sent in response to identifying companion content. For example, when new companion content becomes available (e.g., *The Adventures of Tom Sawyer* audio book), a notification that companion content is available can be sent to users who already own corresponding content (e.g., *The Adventures of Tom Sawyer* e-book). Such a notification can be sent, for example, via electronic mail, push notification, telephony message, automatic download request or any network messaging or communication protocol available between a computing device and the content identification module 124. The notification can be sent to a computing device that is configured to present content and/or that stores the corresponding content. This notification may be used by the computing device to inform and/or assist a user in obtaining the second content via purchase (e.g., via a browser used to navigate an electronic shopping service that offers the second content for sale), lending, sharing, and/or transfer of ownership services. Further, notifications, messages, and/or other communications regarding companion content can be sent in a variety of other contexts. Some example contexts can include a user browsing available content before the user has access to any of the companion content, and sending a user a promotional offer to sample companion content (e.g., a chapter of an audio book and a chapter of an e-book) to try a synchronous presentation experience.

Returning to FIG. 1, the companion identification module 124 may also determine a match score indicative of how well a first content correlates with a second content. The match score may apply to the entire first content and second content or to a subset thereof (e.g., a chapter, act, or part). The match score may be indicative of the overall quality of synchronously presenting the companion content, while the passage mismatch score described above may be useful in synchronously presenting the companion content, for example, as will be described below with reference to FIGS. 7 and 8. The match score may be calculated like the passage mismatch score described above. In some instances, the match score can correspond to a percentage or ratio of any unit of the first content correlating to a corresponding unit of the second content. In a specific example, the match score can be the percentage of words in an e-book that correlate to corresponding words in an audio book. The match score may be used to determine whether pairs of content are companion content. For example, a minimum match score can be used as a threshold value for determining that a content pair is companion content for which content synchronization information will be generated.

Since portions of companion content may not correlate with each other, the match score can be used to process companion content with varying ranges of correlations into any number of groups that can be processed differently. For example, using the match score, the companion identification module 124 may synchronize an unabridged e-book with a corresponding unabridged audio book or synchronize the unabridged e-book with a corresponding abridged audio book. Accordingly, the user's computing device can automatically present companion content synchronously when the match score satisfies a threshold and/or provide a subset of features related to synchronizing the companion content when the companion content has a match score below a predetermined threshold.

The content identification system 102 can further be associated with the companion data store 120 for storing content information obtained by the external data source interface component 122, utilized by the companion identification module 124, and/or generated by the companion identification module 124. The companion data store 120 can also store content synchronization information obtained and/or generated by the content management system 202. The companion data store 120 may store content information used to determine whether content pairs are companion content, data identifying companion content, and/or match scores. For instance, the companion data store may store a list, database, or other suitable data structure that identifies companion content as determined by the content identification system 102.

The content identification system 102 may be operable on one or more computing devices, such as server computing devices, cloud nodes, client computing devices, and/or mobile computing devices. Additionally, the external data source interface component 122 and/or the companion identification module 124 may be implemented in a single computing device or across multiple computing devices. Likewise, although the companion data store 120 is illustrated as local to the content management system 102, the data store 120 can correspond to a distributed data store and/or a network based data store. The content identification system 102 may include any one of a number of additional hardware and/or software components that would be utilized in the illustrative computerized network environment to carry out the illustrative functions of the content identification system 102 and/or any of the individually identified components.

Figure 2:
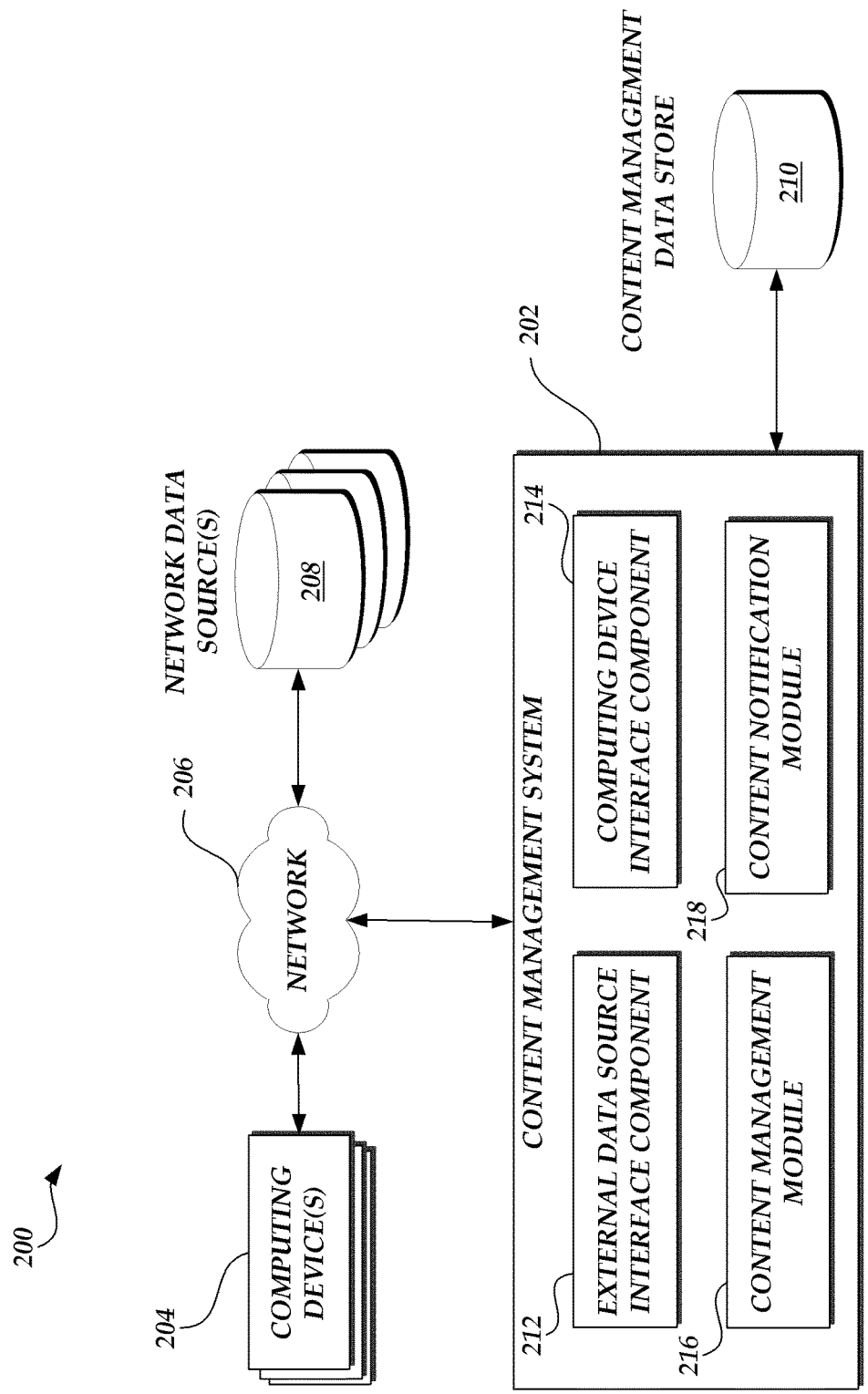
FIG. 2 is a block diagram depicting an illustrative content management environment for use in providing synchronization information to one or more computing devices.

Referring to FIG. 2, a block diagram depicting an illustrative content management environment 200 for use in managing content synchronization information and notifying customers of the availability of content synchronization information will be described. As illustrated in FIG. 2, the content management environment 200 includes a content management system 202 for managing content synchronization information. The content match may be determined from content information obtained from one or more computing devices 204 and/or one or more network data sources 208 via the network 206. Additionally, the content management system 202 can store content information, content synchronization information, and/or other information related to content management in an electronic content management data store 210.

The content management environment 200 can include one or more computing devices 204 for presenting content to a user. In an illustrative embodiment, the computing devices 204 can include various hardware and/or software components for obtaining and presenting digital content to a user, including, but not limited to, browser software applications, image viewing software applications, electronic publication viewing software applications, media playing software applications, and the like. The computing devices 204 can correspond to a wide variety of devices or components that are capable of initiating, receiving or facilitating communications over a communication network and/or presenting content. The computing devices 204 can include, but are not limited to, a laptop, personal computer, a tablet computer, personal digital assistant (PDA), hybrid PDA/mobile phone, mobile phone, electronic book reader, digital media player, television, integrated components for inclusion in computing devices, appliances, electronic devices for inclusion in vehicles or machinery, gaming devices, and the like.

The content management system 202 can include an external data source interface component 212 for obtaining content information from network-based resources, such as the network data sources 208 and/or the companion identification system 102. The content management system 202 can also include a computing device interface component 214 for obtaining content information from computing devices 204. The content information obtained from the network data sources 208 and/or the computing devices 204 may include any information that can be used to identify a content match and/or a device to send content synchronization information. For instance, the content information may include information that identifies content, information associating content with a user or group of users, and/or information related to the content itself. By obtaining content information from different sources and/or at different points in time, the content management system 202 can be used to gather data related to decoupled content. In this way, the content management system 202 can identify relationships between decoupled content that may otherwise be unknown due to the decoupled nature of the content.

The content management system 202 can also include a content management module 216 for identifying a content match, identifying a computing device 204 to transmit content synchronization information to, causing transmission of content synchronization information to one or more computing devices 204 via a network 206, or any combination thereof. The external data source interface component 212 and the computing device interface component 214 may be utilized to cause the transmission of information to the one or more network data sources 208 and/or one or more computing devices 204, respectively.

Moreover, the content management system 202 can also include a content notification module 218 for notifying users (e.g., users of computing devices 204) of the availability of companion content based on notification triggers. In some embodiments, the content notification module 218 may further be operable to modify an item of content (e.g., a second content) in order to provide only a portion of the content to a user. For example, the content notification module 218 may create modify content in order to create enable a trial of the content (e.g., by limiting the amount of content possible to consume, the time period in which it may be consumed, etc.). Similarly to as described above, the computing device interface component 214 may be utilized to cause the transmission of notifications to the one or more one or more computing devices 204. The content notification module 218 will be discussed in more detail with respect to FIGS. 10-14, below.

The content management system 202 can further be associated with the content management data store 220 for storing content information, companion content information, device identification information, content synchronization information, other information related to content management, or any combination thereof. Such information may be obtained by the content management system from the computing devices 204 and/or the network data sources 208 via the network 206. In addition, the information stored in the content management data store 210 can be generated by the content management system 202, for example, by the content management module 216.

The content management system 202 may be operable on one or more computing devices, such as server computing devices, personal computing devices, and/or mobile computing devices. Additionally, the external data source interface component 212, the computing device interface component 214, the content management module 216, or any combination thereof may be implemented in a single computing device or across multiple computing devices. Likewise, although the content management data store 210 is illustrated as local to the content management system 202, the data store 210 can correspond to a distributed data store and/or a network based data store. The content management system 202 may include any one of a number of additional hardware and/or software components that would be utilized in the illustrative computerized network environment to carry out the illustrative functions of the content management system 202 and/or any of the individually identified components.

Figure 3A:
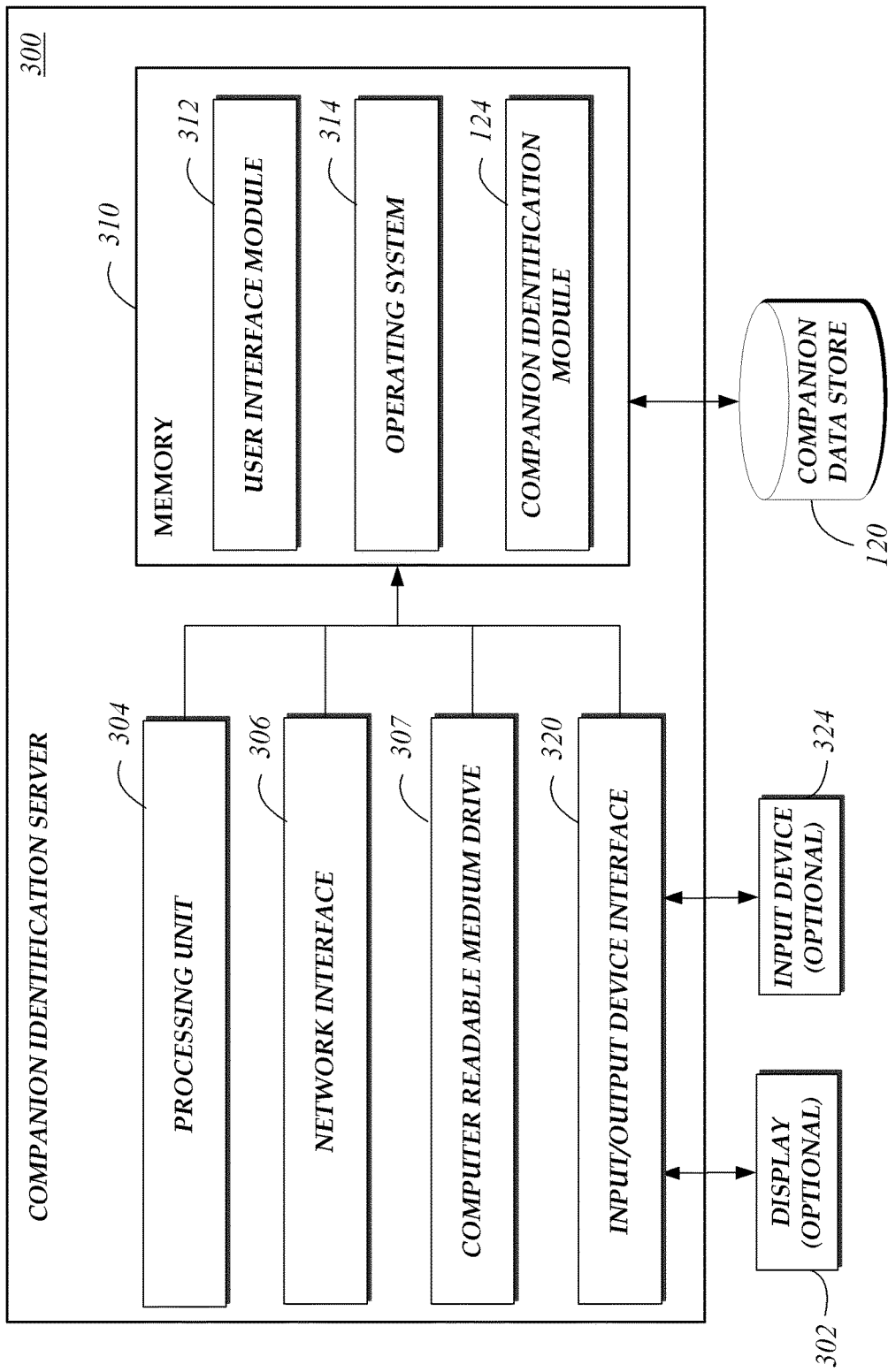
FIG. 3A depicts an illustrative general architecture of a companion identification server for identifying companion content that can be synchronously presented.

FIG. 3A depicts an illustrative general architecture of a companion identification server 300 for identifying companion content. The companion identification server 300 is an example implementation of the companion identification system 102. The general architecture of the companion identification server 300 depicted in FIG. 3A includes an arrangement of computer hardware and software components that may be used to implement aspects of the present disclosure. The companion identification server 300 may include more (or fewer) components than those shown in FIG. 3A. As illustrated, the companion identification server 300 includes a processing unit 304, a network interface 306, a computer readable medium drive 307, an input/output device interface 320, an optional display 302, and an optional input device 324, all of which may communicate with one another by way of a communication bus. The network interface 306 may provide connectivity to one or more networks or computing systems. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc.

The memory 310 may include computer program instructions that the processing unit 304 executes in order to implement one or more embodiments. The memory 310 generally includes RAM, ROM and/or other persistent or non-transitory memory. The memory 310 may store an operating system 314 that provides computer program instructions for use by the processing unit 304 in the general administration and operation of the companion identification server 300. The memory 310 may further include computer program instructions and other information for implementing aspects of the present disclosure. For example, in one embodiment, the memory 310 includes a user interface module 312 that generates user interfaces (and/or instructions therefor) for display upon a computing device, e.g., via a navigation interface such as a web browser installed on the computing device. In addition, memory 310 may include or communicate with one or more auxiliary data stores, such as companion data store 120.

In addition to the user interface module 312, the memory 310 may include a companion identification module 124 that may be executed by the processing unit 304. In one embodiment, the companion identification module 124 implements various aspects of the present disclosure, e.g., determining which pairs/combinations of content are companion content that can be synchronized and/or computing a match score indicative of how well companion content correlates with each other. While the companion identification module 124 is shown in FIG. 3A as part of the companion identification server 300, in other embodiments, all or a portion of the module may be a part of the computing devices 204. For example, in certain embodiments of the present disclosure, the computing devices 204 may include several components that operate similarly to the components illustrated as part of the companion identification server 300, including a user interface module, companion identification module, processing unit, computer readable medium drive, etc. In such embodiments, the computing devices 204 may communicate with a companion data store, such as the companion data store 120, and the companion identification server 300 may not be needed in certain embodiments.

Figure 3B:
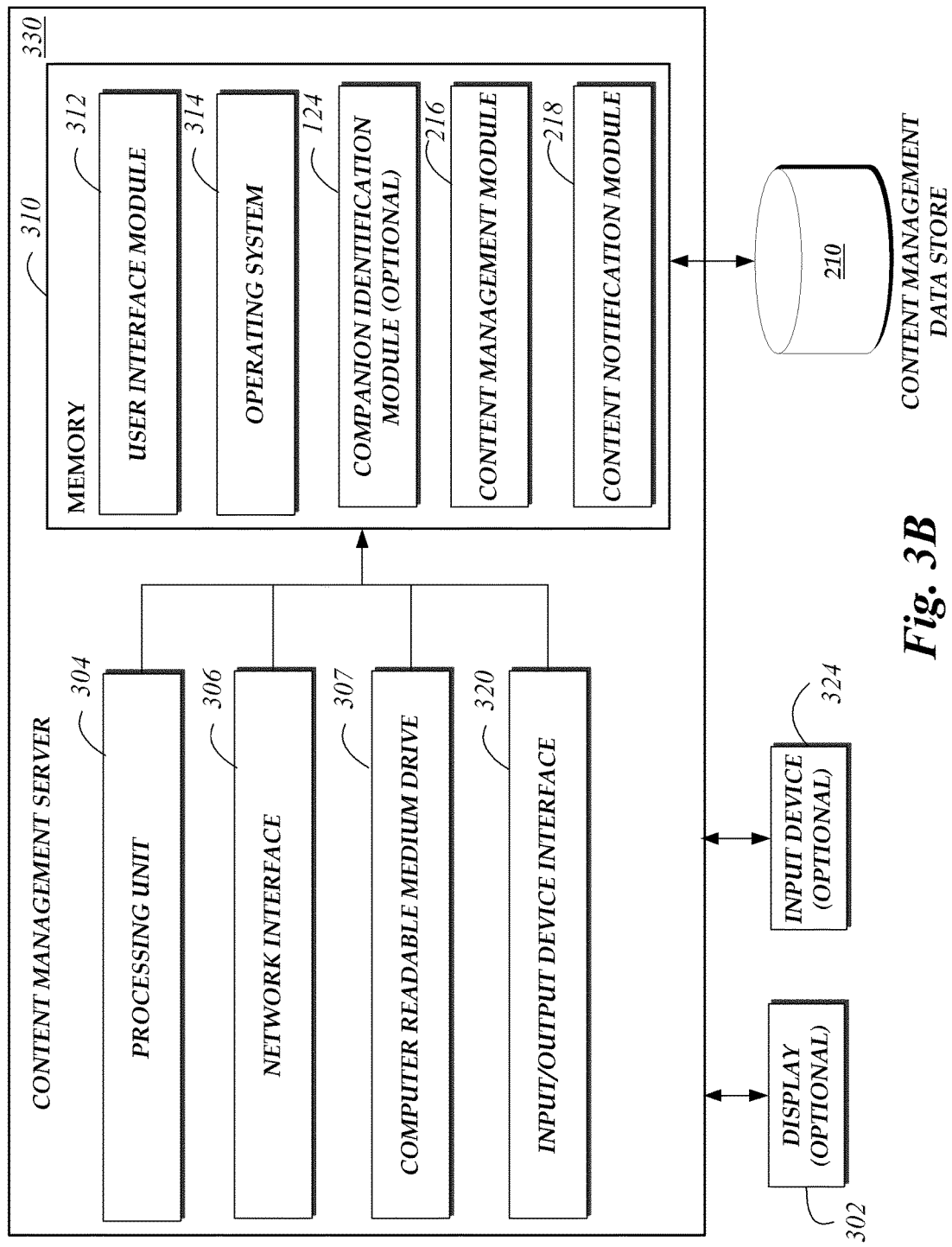
FIG. 3B depicts an illustrative general architecture of a content management server for providing content synchronization information to one or more computing devices.

FIG. 3B depicts an illustrative general architecture of a content management server 330 for managing content synchronization information. The content management server 330 is an example implementation of the content management system 202. The general architecture of the companion identification server 330 depicted in FIG. 3B can include any combination of the features of the companion identification server 300, for example, as described in reference to FIG. 3A, where like reference numbers indicate like parts.

The memory 310 of the content management server 330 may also include a content management module 216 that may be executed by the processing unit 304. The memory may also communicate with the content management data store 210. In one embodiment, the content management module 216 implements various aspects of the present disclosure, e.g., identifying a content match, identifying a device for which to transmit content synchronization information, causing transmission of content synchronization information, or any combination thereof. Further, the memory 310 of the content management server 330 may also include a content notification module 218 that may be executed by the processing unit 304. In one embodiment, the content notification module 218 implements various aspects of the present disclosure, e.g., detecting a notification trigger from a user, notifying a user as to the availability of companion content that may be synchronously presented, providing portions of companion content to the user, or any combination thereof.

While the content management module 216 and the content notification module 218 are shown in FIG. 3B as part of the content management server 330, in other embodiments, all or a portion of a content management module 216 and/or the content notification module 218 may be a part of one or more computing devices 204. For example, in certain embodiments of the present disclosure, the computing devices 204 may include several components that operate similarly to the components illustrated as part of the content management server 330, including a user interface module, content management module, content notification module, processing unit, computer readable medium drive, etc. In such embodiments, the computing devices 204 may communicate with a content management data store, such as the content management data store 210, and the content management server 330 may not be required.

Figure 4A:
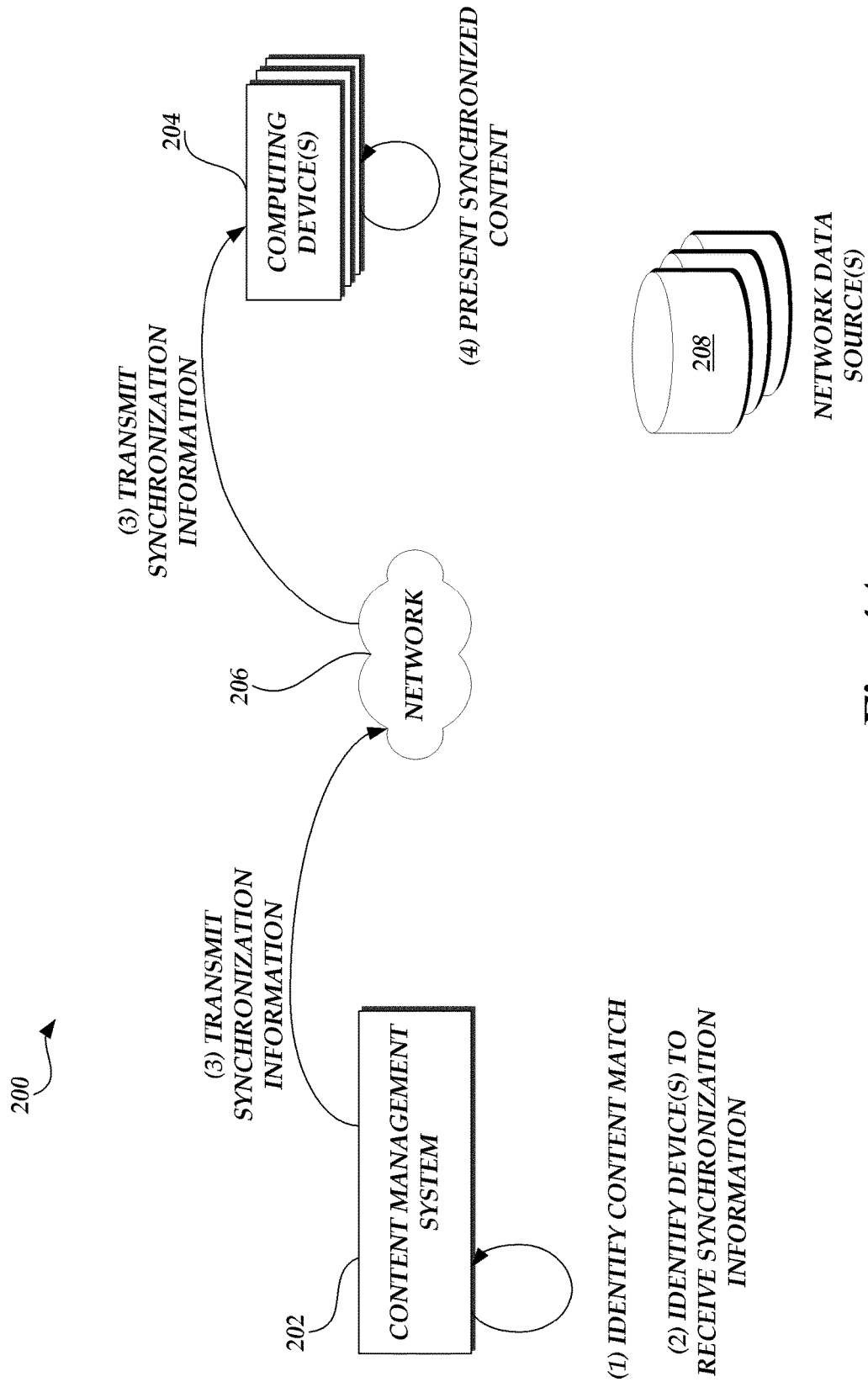
FIGS. 4A and 4B are block diagrams of the content management environment of FIG. 2 illustrating various embodiments for the transmission of synchronization information based on an identified match between first content and second content.
Figure 4B:
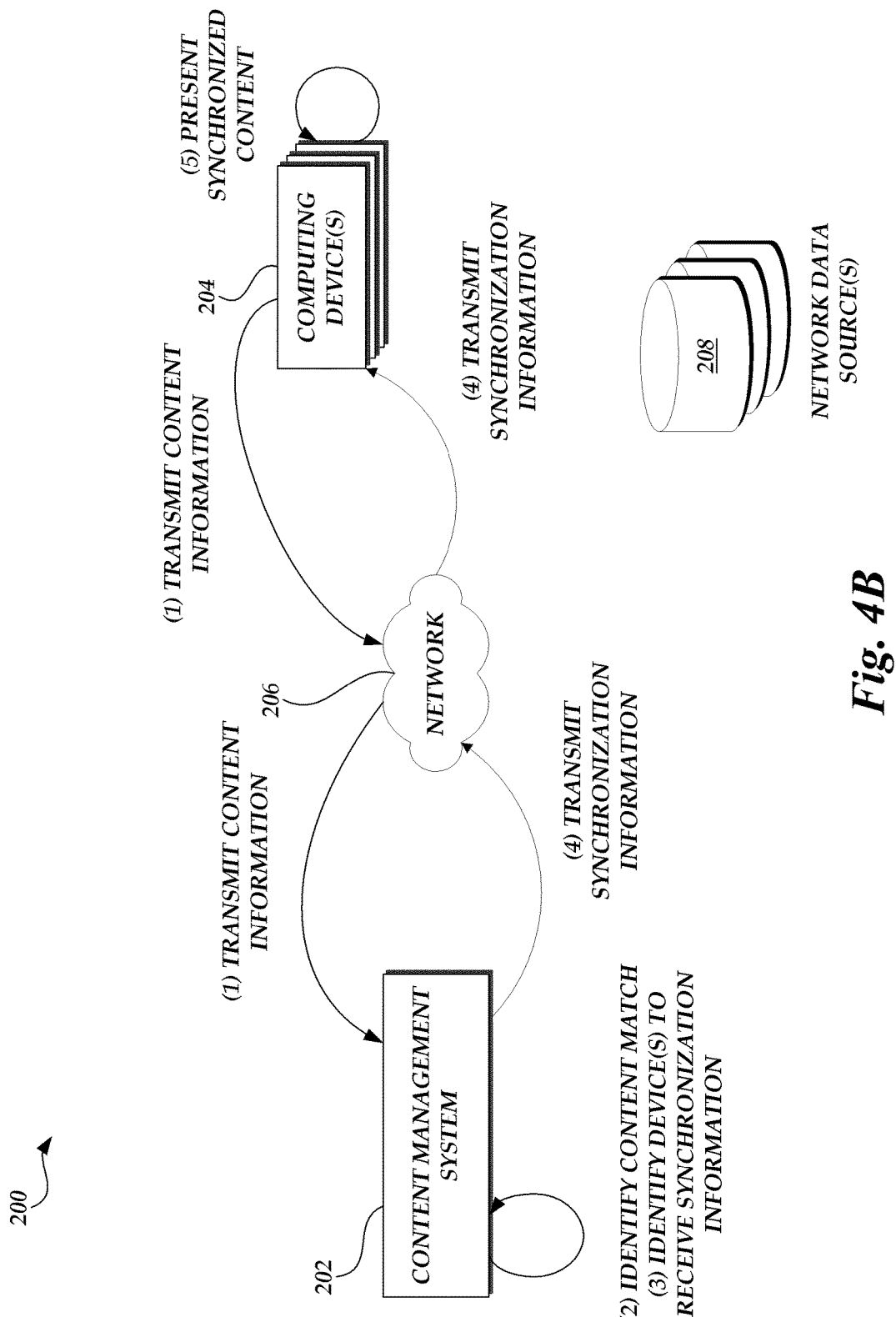

With reference to FIGS. 4A and 4B, the interaction between the various components of the content management environment 200 (FIG. 2) will be described. More specifically, with reference to FIG. 4A, embodiments in which synchronization information is provided at the direction of the content management system 202 will be described. With reference to FIG. 4B, embodiments in which synchronization information is provided at the direction of a computing device 204 will be described.

Due to the decoupled nature of companion content, the content management system 202 can gather content information in a variety of ways and/or at a variety of points in time, in order to identify a content match and/or to identify a particular computing device 204 to which to transmit synchronization information. Synchronization information may include content synchronization information and/or information identifying one or more companion content pairs. The content management system 202 may obtain content information, via the network 206, from network data sources 208 that have access to content information associated with a user and/or information associated with computing devices associated with the user. Similarly, the content management system 202 may obtain content information, via the network 206, from one or more computing devices 204 associated with the user. For example, the content management module 216 may obtain information related to user access to content (e.g., digital ownership history), information related to a user account (e.g., content and/or devices associated with the account), and the like. Such content information may be gathered at the direction of the content management module 216 based on a triggering event. Example triggering events may include, but are not limited to, a change in the user's interaction with content information (e.g., changing privacy settings, updating account information, etc.), a user initiated request, a user purchasing, leasing, sharing, or transferring new content, a user adding content to a new computing device, the content management system 202 identifying that new companion content is available, and the like. Alternatively or additionally, the content management module 216 may gather content information periodically, for example, at predetermined periods of time (e.g., set as a system default or selected at the direction of a user), each time a computing device is activated/deactivated (e.g., when a device is associated with a user account), each time a computing device is powered on/off, and the like. For instance, a computing device 204 may transmit a list of content stored thereon at predetermined intervals (every day, week, two weeks, month, etc.) to the content management system 202 via the network 206. Content information may also be transmitted to the content management system 202 at the direction of a user. Using any combination of these ways of gathering content information, content information for decoupled content can be made available to a common computing system, such as the content management system 202, for identifying content matches. Accordingly, content matches can be determined for potential companion content that is stored on separate computing devices 204, acquired via different transactions (e.g., at different points in time or from different retailers), and the like.

Identifying content matches for decoupled content can vary based on how the content is decoupled. For example, when companion content is decoupled by being purchased at a different point in time from a common retailer, a content match may be identified by the content management system 202 in response to a user buying new content from the common retailer, based on the user's digital ownership history. As another example, when companion content is decoupled by being purchased from different retailers, the content management system 202 can gather information from the different retailers/content providers/distributors and/or from user computing devices storing the content to identify a content match. In yet another example, metadata of content associated with the user can be gathered and analyzed by the content management system 202 to identify content matches for any content that has been decoupled.

Referring to FIG. 4A, once content information for decoupled content is available to the content management system 202, the content management module 216 can identify a content match. Content matches can be identified in response to gathering new content information. Content matches may be identified at predetermined intervals of time (e.g., every day, week, etc.). Alternatively or additionally, content matches can be identified from information available to the content management system 202 on demand in response to a user request or system generated event obtained via the network 206.

The content management module 216 can identify content matches in a variety of ways. The content management module may identify a content match based on comparing metadata and/or a content identifier for each pair of content associated with or owned at a particular time by a user to a list of companion content, for example, as generated by the companion identification module 124. In some implementations, the content management module 216 can identify content matches based on comparing match scores of content pairs (e.g., as computed by the companion identification module 124) to a predetermined threshold. The content management module 216 may also identify whether pairs of content can be synchronized by correlating the digital representations of pairs of content.

After identifying a content match, the content management module 216 may identify a receiving computing device to receive synchronization information. In some instances, the receiving computing device can be a computing device 204 that has provided content information to the content management system 202. In other instances, the receiving computing device may be a different computing device 204 that has not provided content information to the content management system 202. The receiving device may receive synchronization information without obtaining access to any portion of content of a companion content pair associated with the synchronization information and/or prior to obtaining access to any portion of content of a companion content pair associated with the synchronization information. In certain instances, the receiving computing device may request the content synchronization information. The receiving computing device may be associated with a user, user account, or group of users associated with the content match. For example, the content management module 216 can associate a user with the content match by identifying, using content information for the first and second contents, that the user has access to both contents in a companion content pair that make up the content match. Further, the receiving computing device may be configured to synchronously present the companion content. Yet, in some implementations, one or more receiving computing devices may synchronously present companion. The receiving computing device may also be determined based on available content synchronization information and/or compatibility with the receiving computing device. Still further, the receiving computing device may locally store the companion content on memory or stream the content from one or more network resources.

The content management module 216 can cause any portion of the synchronization information (e.g., at least a portion of the content synchronization information) to be transmitted from the content management system 202 and/or the content management data store 210 to the receiving computing device 204 via the network 206. Synchronization information, or any other information transferred via the network 206, may be encrypted or otherwise protected utilizing any number of digital rights management techniques. For instance, synchronization information can be encrypted when content associated with the synchronization information is encrypted. In some implementations, synchronization can be encrypted using information indicative of a device or a group of devices such that an identifier stored on a device receiving the synchronization information can be used to decrypt the synchronization information. The synchronization information can be stored remotely from the receiving computing device 204, for example, in the content management data store 210. When data is stored remotely from the receiving computing device, the content synchronization information can be streamed on the receiving computing device. Alternatively or additionally, the content synchronization information may also be stored locally on the receiving computing device. This can allow the receiving computing device to synchronously present companion content when it is off-line.

With access to synchronization information that includes content synchronization information, the receiving computing device 204 can synchronously present companion content. Synchronously presenting companion content can include, for example, displaying the text of an e-book while playing the corresponding audio book. More details regarding synchronous presentation of companion content will be provided with reference to FIGS. 7-9.

Alternatively or additionally, with access to the synchronization information regarding a companion content pair, the receiving computing device can use the information identifying the companion content pair for a variety of purposes, such as generating content synchronization information, generating a message that the receiving device has access to companion content, and the like. For example, the receiving device may receive a list of companion content pairs to which the receiving device has access. Using the list, the receiving device can then generate content synchronization information for a companion content pair, for example, using any combination of features described herein. Further, the information identifying companion content pairs may also include match scores, which can be used to generate content synchronization information, as described above.

Referring to FIG. 4B, the content management module 216 can identify a content match at the direction of a computing device 204. The computing device 204 can transmit content information to the content management system 202 via the network 206. This can provide the content management system 202 with content information related to at least one content in a companion content pair. By receiving content information from the computing device 204, the content management system 202 can obtain content information for a second content of a companion content pair so that the content management system 202 can identify a content match. In some instances, the content management system 202 may obtain access to content information for the first content from the computing device 204, one or more other computing devices, and one or more network data sources 208, or any combination thereof. The content information for the first content and the content information for the second content may be obtained at different points in time.

The content management module 216 can identify a content match in response to obtaining content information from the computing device 204, for example, using any combination of features described with reference to FIG. 4A. After identifying the content match, the content management system 202 can transmit synchronization information to one or more receiving devices, which may include the computing device 204 that transmitted content information. Using content synchronization information included in the synchronization information, a single computing device can synchronously present companion content. For instance, an e-book can synchronously present text of while playing a corresponding audio book. In other implementations, multiple devices can synchronously present content. For instance, an e-book reader can present text while a media player synchronously plays a corresponding audio book.

In another embodiment, the computing device 204 can identify a content match based on content stored thereon and/or content information obtained, via the network 206, from other computing devices 204 and/or network resources 208. The computing device 204 can then send a request for content synchronization information to the content management system 202 via the network 206. In response to the request, the content management system 202 can transmit content synchronization information to one or more computing device 204 via the network 206.

According to another embodiment, the computing device 204 can identify a content match and generate the content synchronization information. Alternatively or additionally, the computing device can use a list of companion content pairs included in the synchronization information to generate content synchronization information. In some instances, the computing device can generate the content synchronization information based on a metric indicative of how well content in a potential companion content pair correlates, such as the match score described above. When the metric satisfies a predetermined threshold, the content synchronization information can be generated. In some instances, the content synchronization information can be generated in "real time." The computing device 204 can further be configured to transmit any portion of the content synchronization information to another computing device. Moreover, multiple computing devices 204 can identify a content match and/or generate content synchronization information. The content synchronization information generated by one or more computing devices 204 can be stored locally on the one or more the computing devices 204 and/or in an external data store, such as the content management data store 210.

Figure 5:
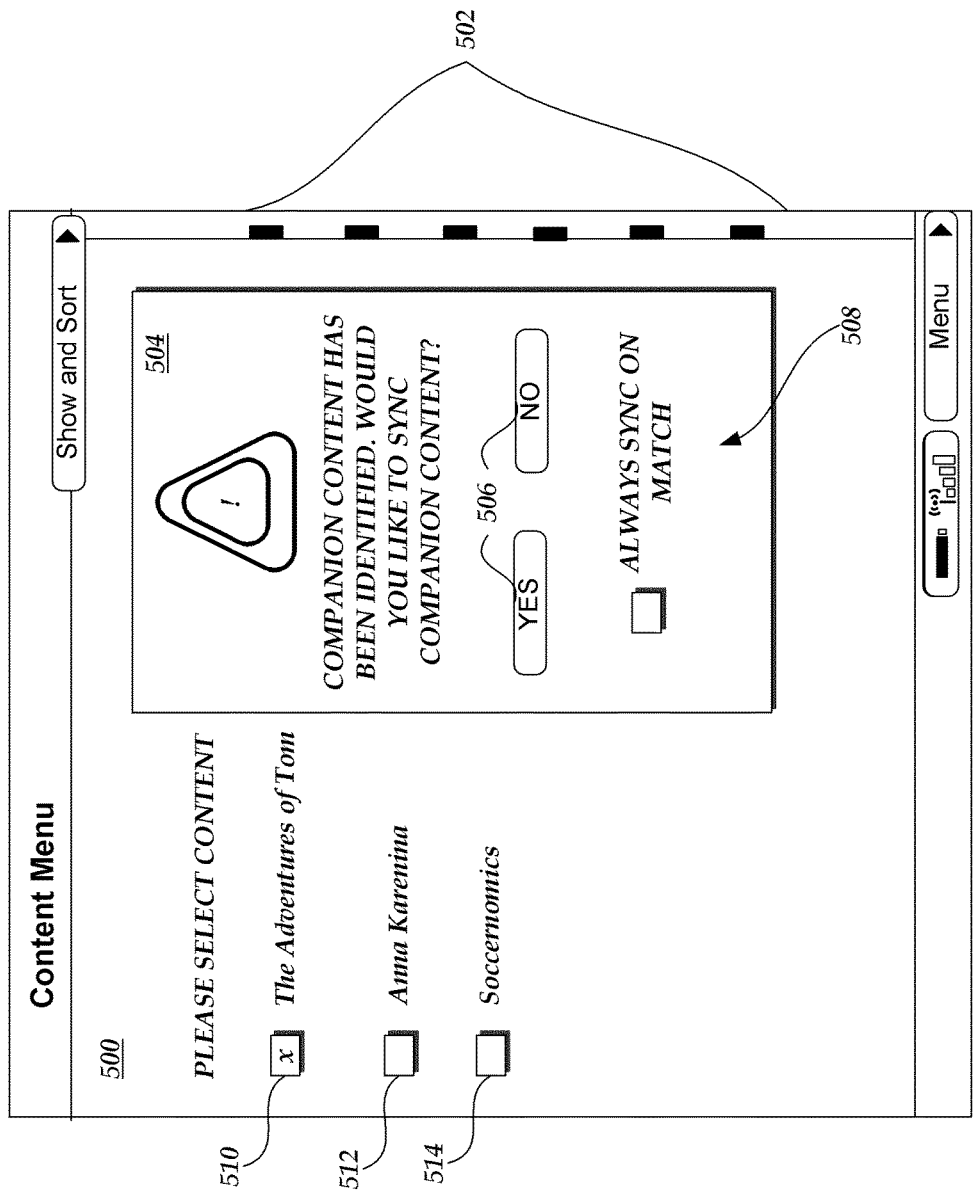
FIG. 5 is an illustrative interface generated on a computing device for selecting options related to an identified content match.

FIG. 5 is an illustrative interface 500 generated on a computing device 204, such as a computing device that can synchronously present companion content, for selecting options related to a content match identified by the computing device 204. The interface 500 can include a first portion 502 for presentation of available content. The user may select content (e.g., an e-book) via one or more selection elements 510, 512, 514 presented by the interface 500. In response to the selection of content, the computing device 204 may determine whether the user has access to companion content. The computing device 204 may obtain content synchronization information (e.g., from a content management system 202 and/or by generating content synchronization information itself) and/or obtain access to another content that is part of a companion content pair that includes the selected content. The computing device 204 may prompt a user to confirm a desire to synchronously present content companion content and/or to configure the computing device for future preferences related to synchronously presenting companion content. As illustrated in FIG. 5, the interface 500 can include a second portion 504 that presents a notification indicating that there is available companion content that can be presented synchronously with the selected content. Additionally, the second portion 504 can include a control 506 for obtaining a confirmation from the user of his or her desire to synchronously present companion content. Still further, the second portion 504 can include one or more configuration elements 508 for enabling the user to configure the criteria upon which the computing device 204 will automatically synchronize companion content. The configuration elements 508 may also enable the user to a default based a degree of a content match. For example, the user can select to always synchronize companion content on a strong match, as indicated by a match score satisfying a predetermined threshold. Although FIG. 5 has been illustrated with regard to a combination of confirmation and configuration functionality, one skilled in the relevant art will appreciate that any number of separate or combined interfaces can be used to collect the confirmation information or configuration information. Additionally, although interface 500 is illustrated with regard to a display screen of a computing device 204, the interface 500 may be generated by any type of computing device and modified in accordance with resources associated with such alternative computing devices.

Figure 6:
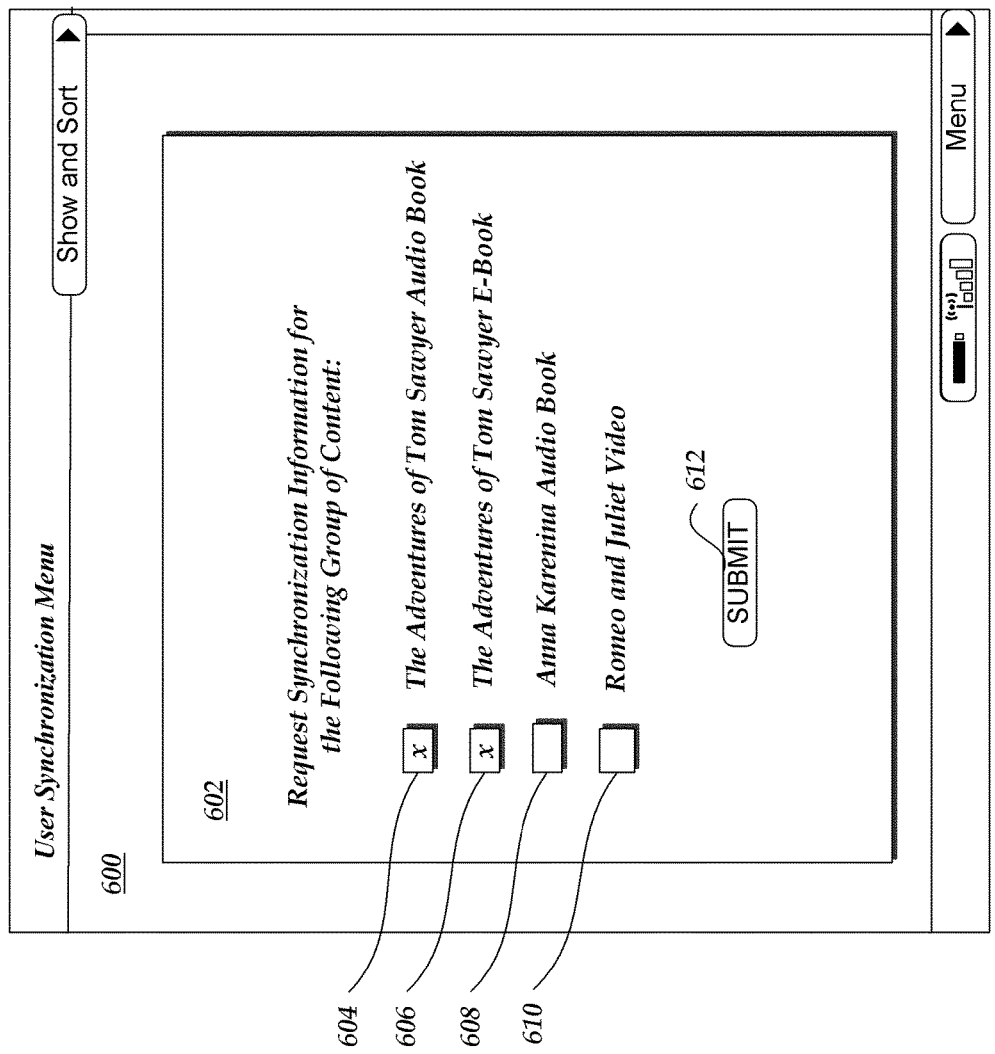
FIG. 6 is an illustrative interface generated on a computing device for requesting content synchronization information for selected content.

FIG. 6 is an illustrative interface 600 generated on a computing device 204 that can synchronously present companion content. The interface 600 identifies a content match at the direction of a user. With reference to FIG. 6, the interface 600 includes a presentation portion 602 that identifies the content available to the user using the computing device 204. In the illustrated example, a list of available content is presented to the user. The available content can include any combination of companion content described herein, as well as content for which no companions have been identified. The available content may include companion content in a number of different versions and/or formats (e.g., e-book, audio book, page image, etc.). Selection elements 604, 606, 608, 610 can enable a user to identify a content match and/or select one or more contents for which to request content synchronization information. The content synchronization information can then be used to synchronously present companion content. For example, as illustrated in FIG. 6, a user can select a first content, e.g., an audio book of *The Adventures of Tom Sawyer*, and a second content, e.g., an e-book of the same. Then the user may submit a request for content synchronization information via a submission element 612. In response to the submission, the computing device 204 may verify that the selected first and second content can be synchronized. In some implementations, the computing device 204 can further generate content synchronization information for the first and second content. In other implementations, the computing device 204 can transmit a request related to the content synchronization information to one or more other computing devices (e.g., to the content management system 202) via a network (e.g., the network 206). Such a transmission can include a request to determine whether the first and second content are a content match and/or a request for the content synchronization information for the first and second content.

Figure 7:
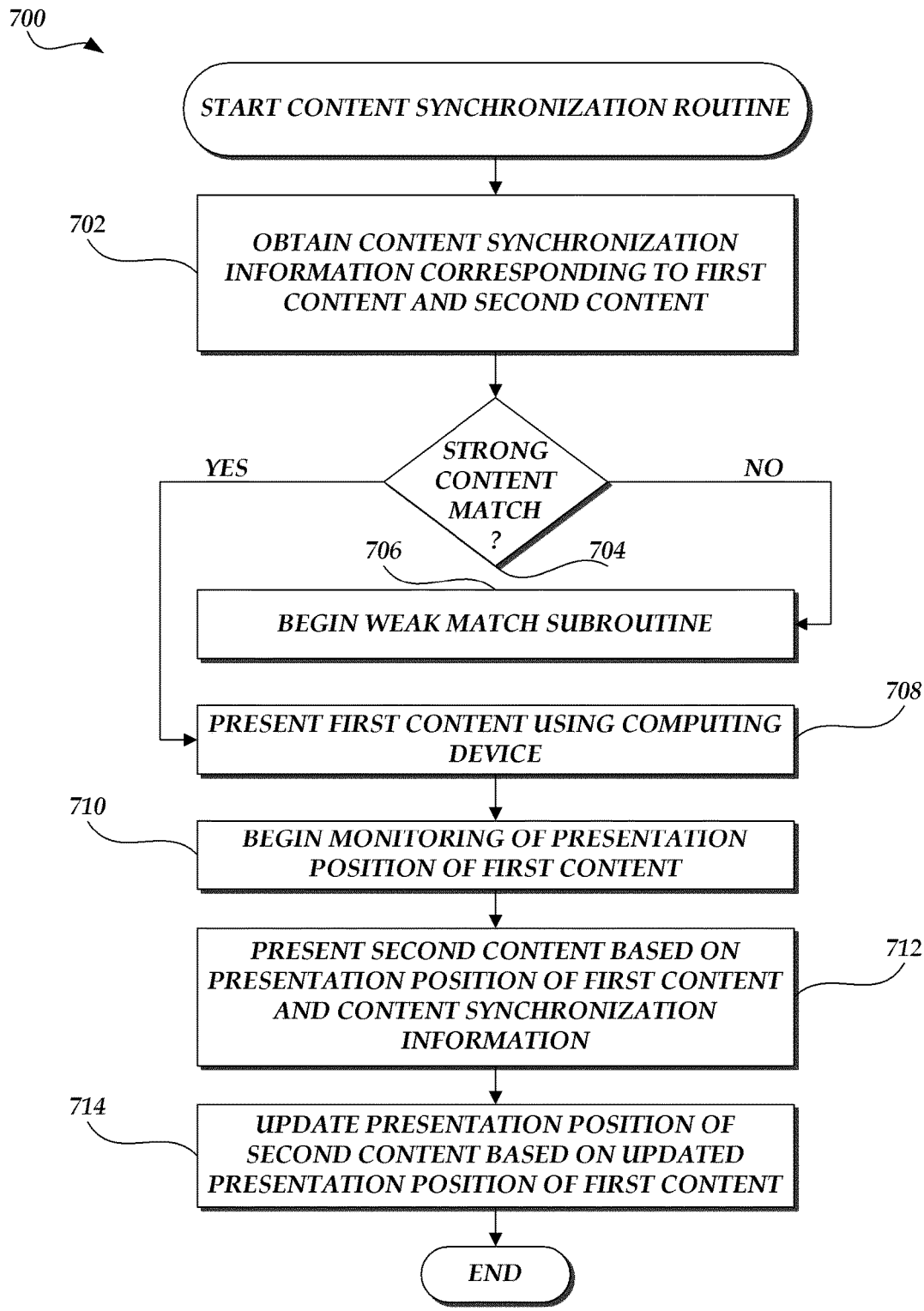
FIG. 7 is a flow diagram of an illustrative method of presenting synchronized content.
Figure 8:
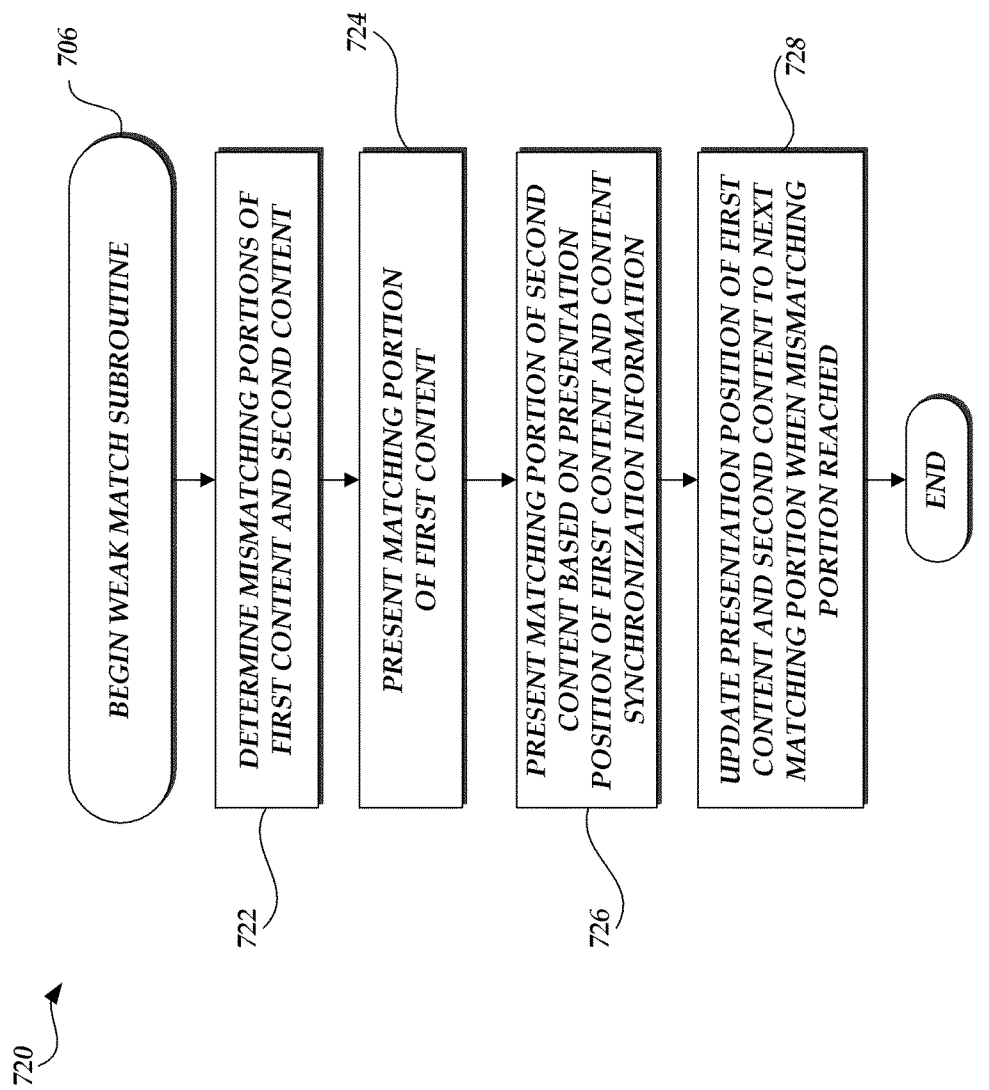
FIG. 8 is a flow diagram of an illustrative method of rending synchronized content that includes mismatches in companion content.

Once a computing device 204 has obtained content synchronization information associated with a content match of a first content and a second content, the computing device 204 can synchronously present the first content and the second content to a user. FIGS. 7 and 8 depict illustrative methods of synchronously presenting companion content. Although these illustrative methods describe synchronously presenting a pair of companion content, the features described with reference to these illustrative methods can be applied to synchronously presenting a larger combination of companion content.

Referring to FIG. 7, a flow diagram of an illustrative method 700 of synchronously presentation companion content will be described. At block 702, a computing device 204 can obtain content synchronization information corresponding to a first content and a second content. The content synchronization information may be obtained, for example, from a data store (e.g., data store 210) and/or a separate computing device. Alternatively or additionally, the content synchronization information may be obtained by the computing device 204 generating the content synchronization information. As previously described, the content synchronization information can include information regarding positions in the first content that correspond to positions in a second content (e.g., a page and line in an e-book and a playback position of an audio book), additional information related to synchronous presentation (e.g., information for highlighting, underlining, etc. a portion e-book that corresponding to the playback of an audio book), information identifying portions of the first and second content that match/mismatch (e.g., information identifying portions of an unabridged e-book that do not correspond to an abridged audio book), or any combination thereof.

At decision block 704, a test may be conducted to determine to what degree companion content matches with each other. For example, the test can include determining whether a content match score satisfies a predetermined threshold. As previously described, the companion identification module 124 can be configured to determine a content match score indicating how well a content pair of companion content correlate with each other. Companion content can be divided into any number of subdivisions based on content match scores. For example, a companion content pair associated with a content match score that satisfies a predetermined threshold can be considered a strong match. In this example, a companion content pair associated with a content match score that does not satisfy the threshold can be considered a weak match. The threshold can be determined programmatically by one of more computing devices and/or set/adjusted at the direction of a user.

If the content match is determined to be weak match, a weak match subroutine can begin at block 706. More detail regarding the weak match subroutine will be provided with reference to FIG. 8. Alternatively, if the content match is determined to be a strong match, the first content can be presented using a computing device 204, at block 708. The first content can be presented in any manner that the computing device 204 is capable of presenting content, such as visually, aurally, tactilely (e.g., via mechanical vibrations and/or by presenting Braille), or any combination of thereof. The first content may be any type of content described herein, for example, an audio book. Further, the first content may include only a portion of a work, for example, a chapter of an audio book.

At block 710, a computing device 204 can begin monitoring a presentation position of the first content. The presentation position may be a reference point or tracking point associated with the first content. For example, the presentation position may represent a textual position, a playback position, and/or any other indicator of a position of the first content that is being presented. In a specific example, the textual position may correspond to a page or any other unit of text within the first content. In another specific example, the playback position may correspond to units of time (e.g., seconds) from a starting point.

The presentation position of the first content can used in combination with content synchronization information to determine a corresponding presentation position in the second content. For example, the content synchronization information may be used to map a presentation position of the first content to a corresponding presentation position in the second content. In some instances, the content synchronization information can include a map of reference points in the first content that correspond with reference points in the second content, which can be used to determine a presentation position in the second content.

The second content can be synchronously presented with the first content based on the presentation position of the first content and the content synchronization information at block 712. Like the first content, the second content can be any of the content described herein and presented in any manner that a computing device 204 is capable of presenting the second content, such as visually, aurally, tactilely, or any combination of thereof. The second content may be, for example, an e-book. In addition, the second content may include only a portion of a work, for example, a chapter of an e-book. In some instances, the second content can be presented using the same computing device used to present the first content. In other instances, the second content is presented using a separate computing device in communication with the computing device that presents the first content.

At block 714, the presentation position of the second content can be updated based on a presentation position of the first content. For example, as the presentation position of the first content changes, the computing device 204 can determine a corresponding presentation position for the second content using the synchronization information. Based this determination, the presentation position of the second content can be synchronized with the presentation position of first content. In a specific example, this may include turning the page of an e-book when the playback of an audio book has advanced beyond the text associated with a page being displayed or to the end of the text associated with the page being displayed. The presentation position of the second content can be continually updated based on the presentation position of the first content to enable an enhanced user experience of synchronously consuming the first content and the second content. When the first content and/or the second content include only a portion of a work, the computing device 204 can disable synchronous presentation of companion content for portions of the first content and second content that content synchronization information indicates do not correspond to each other.

Referring to FIG. 8, a flow diagram depicting an illustrative method 720 of synchronously presenting companion content that are a weak match, e.g., because the companion content includes content mismatches, will be described. As previously described, companion content pairs may include mismatches between some portions of content in a companion content pair. The method 720 may be performed to present companion content considered to be a content match, but having a relatively low degree of correlation, for example, as determined at decision block 704 of the method 700. Accordingly, method 720 can be implemented in connection with any combination of features of method 700.

The illustrative method 720 may begin at block 706 and proceed to block 722, where mismatching segments of the first content and the second content are determined. Alternatively or additionally, matching segments of the first content and the second content can be determined. These mismatching/matching segments of content can be determined using the content synchronization information. For instance, the content synchronization information may include reference or tracking points at which portions of the first content and the second content begin to correlate with each other and/or stop correlating with each other. This information can be used to identify portions of the potential companion content that mismatch.

A portion of first content that matches the second content can be presented at block 724. Then, at block 726, a portion of the second content can be synchronously presented based on the presentation position of the first content and the content synchronization information. The presentation position of the second content can be continually updated based on the content synchronization information and the presentation position of the first content, for example, as previously described. When a mismatching segment is reached by the first content, the presentation position of both the first content and the second content can be updated to the next matching segment at block 728. In this way, the method 720 can continue to synchronously present the first content and the second content even when a significant portion of either content does not match with the other content. In another implementation, when a mismatching portion in either content is presented, synchronous presentation can be disabled until a matching portion is presented, at which point synchronous presentation can resume.

Figure 9:
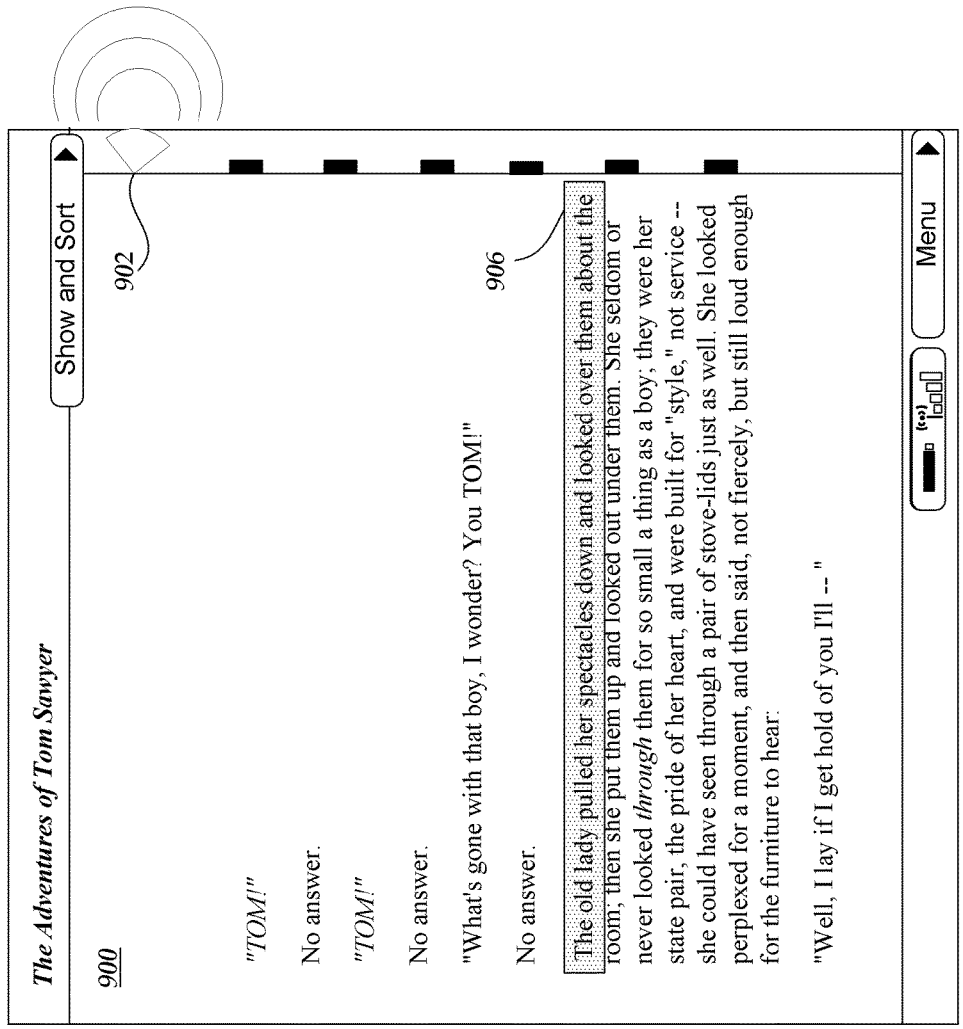
FIG. 9 depicts an illustrative computing device synchronously presenting companion content.

FIG. 9 illustrates an example of computing device 204 synchronously presenting companion content, such as an e-book and a corresponding audio book. As illustrated in FIG. 9, the computing device 204 can visually present text of the e-book on a display 900. The computing device 204 can also aurally present the companion audio book simultaneously via one or more speakers 902 and/or one or more audio outputs, which may be provided to external speaker(s) such as headphones. Content synchronization information may be used to synchronously present and update the presentation position of both the audio book content and the visual e-book content. This may include, for example, any combination of features described in reference to the methods 700, 720 described in reference to FIGS. 7 and 8, respectively.

In addition, the computing device 204 may also present an indicator 906, which can indicate a presentation position of the audio book content in relation to the visual presentation of the e-book content within the visual presentation of the e-book. For example, the text of the e-book presented using the display 900 can be enhanced to indicate the playback position of the audio book presented via the speaker 902. In this regard, text can be highlighted, underlined, and/or presented in different font (e.g., using different color, size, type, effect, etc.). Individual words, lines, sentences, and/or other units of text can be enhanced to indicate an audio playback position. When the playback of the audio book reaches the end of a page of the e-book being presented, the next page of the e-book can be displayed automatically using the content synchronization information.

In some implementations, a user can select any word or group of words of a page of an e-book presented on the display 900 and start playback at a corresponding point in the audio book. Alternatively or additionally, the user can navigate to any point in time in the audio book, and the corresponding page of the e-book can be displayed by the computing device 204, and/or the user can navigate to any position in the e-book and playback of the audio book can begin at the corresponding point in the audio book.

The computing device 204 can also support search and bookmarking functionalities, maintaining the synchronous presentation of both the audio book and the e-book. The computing device 204 can monitor both audio and visual presentation positions, so a user can switch between textual display and audio playback, and resume consumption of the other form of content from the last position.

Although some of the examples were provided in the context of synchronously presenting content, any combination of features described herein may be applied to other content synchronization, as appropriate. For example, content synchronization information can be used to switch back and forth between presenting a first content and a second content. More specifically, in some implementations, a computing device can display the text of an e-book and then switch to playing the audio of an audio book at a corresponding position using the content synchronization information. As another example, the principles and advantages described herein can be used to synchronize companion content on different computing devices outside the context of synchronously presenting companion content. For instance, any combination of features described herein can be applied to any of the examples of synchronizing content on different computing devices such as described in the '473 Application incorporated by reference in its entirety above.

Further, although some of the examples were provided in the context of a retail environment in which a user purchases companion content, any combination of features described herein may be applied to other settings, as appropriate. For example, the user need not purchase content of a companion content pair in order to obtain content synchronization information and/or synchronously consume companion content. Instead, the user may obtain access to one or more individual content of a companion content pair by any number of suitable ways, for example, by borrowing, checking out, renting, permanently leasing, temporarily leasing, or any combination thereof. In a specific example, the user may check out an audio book and synchronously present the audio book with an e-book that the user has purchased. In another specific example, the user may lease an audio book and synchronously present the audio book with a borrowed e-book. As yet another example, in some embodiments, a user may obtain only a portion of a second content (e.g., corresponding to a first content of a companion content pair), and be enabled to synchronously present the first content and the portion of the second content. For example, as will be discussed below, a user that has acquired a first content may be notified that a corresponding second content is available for acquisition. Further, the user may be offered a portion of the second content at a reduced or negated cost. In response, the user may accept the offer, acquire the portion of the second content, and synchronously consume the resultant companion content pair (e.g., the first content and the portion of the second content).

Figure 10:
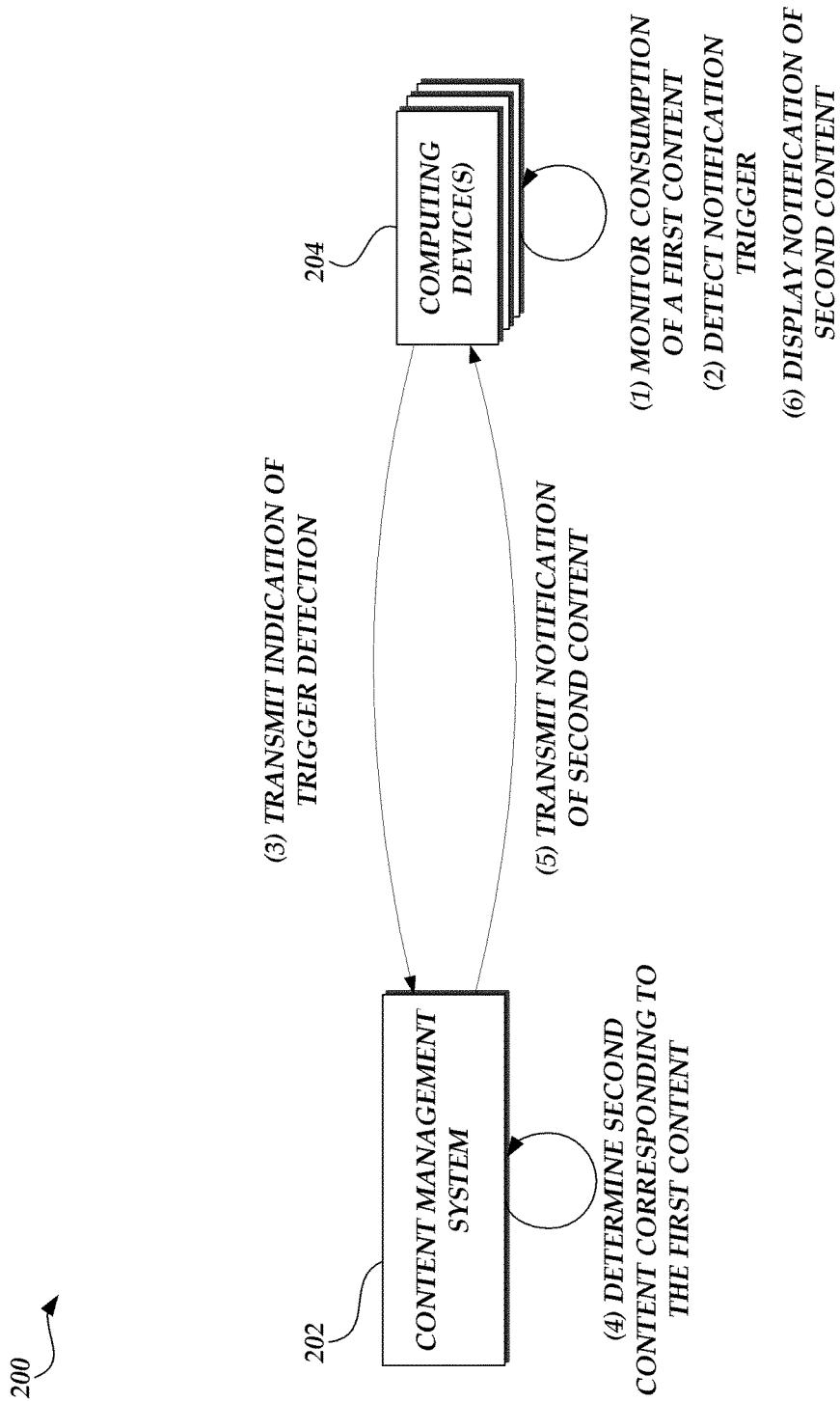
FIG. 10 is a block diagram of the content management environment of FIG. 2 illustrating an interaction for the display of a companion content notification to a computing device in response to a notification trigger.

With reference to FIG. 10, an illustrative interaction for providing a notification regarding companion content to a computing device 204 of FIG. 2 will be described. Such a notification may be facilitated, for example, by the content management system 202 of FIG. 2. Illustratively, a notification may be provided in response to a notification trigger, as will be described below.

As shown in FIG. 10, at (1), a computing device 204 may monitor the consumption of a first content. Illustratively, the computing device 204 may monitor the consumption of the e-book of *The Adventures of Tom Sawyer*. Monitoring consumption of a first content may include, for example, monitoring a current position of consumption of the first content (e.g., a current page read, etc.). Further monitoring consumption of the first content may include monitoring information used to determine a notification trigger, such as the current rate of page turns or font size of an e-book, the current volume of an audio book, the frequency or duration of consumption, etc.

Such monitored information may, alone or in conjunction with additional information, be utilized at (2) to determine a notification trigger. As previously described, a notification trigger may correspond to any action or event, series of actions or events, or user context which indicates a user may desire to be notified of the availability of companion content corresponding to a consumed first content. Moreover, as previously described, notification triggers may be based on additional information, such as a user's purchase history, previous responses to notification triggers, or demographic information. For example, an audio book of *The Adventures of Tom Sawyer* may be available to the user of the computing device 204 (e.g., via the content management system 202), but not yet be acquired by the user. As such, a trigger event may occur at any point where presentation of the audio book version of *The Adventures of Tom Sawyer* may be more desirable than presentation of the e-book.

In some embodiments, a trigger event may correspond to a user initiation of a change of presentation format. For example, the user may halt consumption of *The Adventures of Tom Sawyer* e-book, and begin consumption of an unrelated audio book. Because the user has not yet acquired the audio book version of *The Adventures of Tom Sawyer*, it may be that the user would prefer to continue consuming *The Adventures of Tom Sawyer*, but is unable to do so (e.g., because circumstances are not conducive to consumption of an e-book). As such, user initiation of a change in presentation format may constitute a notification trigger. Similarly, a user may utilize a feature of the computing device 204 which automatically converts the e-book of *The Adventures of Tom Sawyer* into audio, such as via a text-to-speech function. However, the resultant audio may be inferior to the professionally narrated audio book. As such, the user may desire to be notified that such a professionally narrated audio book is available for synchronous playback.

In some embodiments, a notification trigger may be associated with a trigger time. For example, a series of events, actions, or changes in context may be required to occur within a certain period of time. Illustratively, a notification trigger may not be satisfied when a user consumes an e-book on a first day, halts consumption of the e-book, and begins consumption of an audio book on a second day. Similarly, a notification trigger may be satisfied when a user halts consumption of an audio book, and thereafter begins consumption of an e-book within a few minutes. As will be appreciated by one skilled in the art, a trigger time may correspond to any appropriate length of time. Moreover, different notification triggers may be associated with different trigger times.

In addition, though described herein with respect to a single computing device 204, in some embodiments, notification triggers may occur based on activities, events, or contexts of more than one device. For example, a notification trigger may be satisfied when a user halts consumption of an e-book on a first device, and begin consumption of an audio book on a second device. Illustratively, a user may consume an e-book on an e-book reading device, and thereafter begin to consume an audio book on a car stereo system. As such, the user may be notified that an audio version of the consumed e-book is available. In some embodiments, notification triggers occurring over multiple devices may be facilitated by utilizing the same user account over multiple devices, or utilizing associated user accounts. For example, a user's e-book reading device may be associated with a user account. The user's car audio device may also be associated with the same user account. As such, consumption information over both devices may be monitored in order to determine a notification trigger.

In some embodiments, notification triggers may not require the user to explicitly request a format change, but may be based, in whole or in part, on other criteria. For example, monitored consumption information may include a rate of page turns of an e-book. A slowing of the page turns over a period of time may indicate that the user is tired of reading, and may desire to listen to the content instead. As such, a slowing of a reading rate may correspond to a notification trigger. As a further example, a very large font size used to consume a textual content may indicate a difficulty in reading, and therefore the user may desire to be notified that corresponding audio content is available. Similarly, a very loud volume may indicate a difficulty in hearing, and therefore a user may desire to be notified that corresponding textual content is available.

In still more embodiments, notification triggers may be based in whole or in part on the context of a user's device. For example, an e-reader device may detect that the available light level has fallen below a given threshold, and therefore interpret that a user may prefer to listen to the content. As a further example, an audio playback device may detect that headphones are no longer plugged into the device and/or that the external noise level around the device is very high, and may therefore notify the user that a corresponding textual content exists. Moreover, in some embodiments, different formats of presentation may be associated with different computing requirements. For example, it may be more battery efficient to listen to an audio book than to read an e-book when utilizing a computing device with a high power screen (e.g., a high density, full color screen). Alternatively, it may be more battery efficient to read an e-book than listen to an audio book when utilizing a device with a low power screen (e.g., an e-ink screen). As such, a notification trigger may be based on the amount of battery power left to a device, such as the computing device 204. Illustratively, when the computing device 204's battery power drops below a threshold amount, the user may be notified that corresponding content exists in a more power-efficient format. In yet another example, a trigger event may be based on additional context information available to the computing device 204. Illustratively, an accelerometer may indicate that the user is traveling at a high rate of speed. In some instances, this may indicate that the user may wish to consume content in audio, rather than text format. For example, a user may suffer from motion sickness when reading while traveling at a high rate of speed.

In some embodiments, a notification trigger may be based on, or modified based on additional information, such as user preferences. For example, a user may be enabled to opt-in or opt-out of notifications. Further, the user may be enabled to specify certain contexts in which notifications should or should not be delivered (e.g., via certain times of day, at certain locations, etc.). Illustratively, a user may never wish to be notified that companion content is available while at work. As will be discussed below, in some embodiments, notification triggers may be based on an external source of information regarding the user, such as the user's electronic calendar. Further, in some embodiments, notification triggers may be based on additional information regarding a user, such as a user's purchase history, demographic information, previous responses to notification triggers, or any other suitable information that may implicate the user's desire to consume companion content.

Returning to FIG. 10, after a notification trigger has been determined, the computing device 204 may, at (3), transmit an indication of the detection of the notification trigger to the content management system. In some embodiments, this indication may include additional information that may be utilized to create a notification, such as consumption information regarding the consumed first content.

Though notification triggers are discussed above with respect to computing devices 204, in some embodiments, the content management system 202 may be configured to detect notification triggers. For example, the computing device 204 may, periodically or continuously, transmit information regarding the computing device 204 to the content management system 202. Illustratively, the computing device 204 may indicate that the user has halted consuming a given e-book, and has begun consuming an unrelated audio book. The content management system 202 may then determine a notification trigger based on this and/or additional information.

At (4), the content management system 202 may determine a second content corresponding to the consumed first content. Such a determination may be based, for example, on information within the content management data store 210 of FIG. 2, and may include information previously determined by the companion identification system 102 of FIG. 1. In some embodiments, the content management system 202 may be configured to determine a specific second that corresponds to the detected notification trigger. For example, a notification trigger may indicate that a user would rather listen to an audio book than continue reading an e-book. As such, the content management system 202 may be configured to determine an audio book corresponding to the e-book. In some embodiments, each notification trigger may be associated with one or more preferred formats of content. As such, the content management system 202 may attempt to determine a second content of at least one of the preferred formats.

Thereafter, at (5), the content management system 202 may transmit a notification to the computing device 204 regarding the availability of the second content. Illustratively, the notification may inform a user of the computing device 204 of the availability of the second content. In some embodiments, the notification may include an offer to acquire the second content. Illustratively, the notification may correspond to an offer to acquire a trial portion of the second content at a reduced fee or without charge. Accordingly, at (6), the computing device 204 may display the notification to the user of the computing device 204. One example of a displayed notification will be described in more detail with respect to FIG. 13, below.

As will also be described below, in response to a displayed notification, the user may be enabled to accept an offer to acquire the second content. Thereafter, the content management system 202 may deliver all or a portion of the second content to the computing device 204 for playback. In some embodiments, this may include altering the second content (e.g., to enforce usage restrictions) or generating a modified version of the second content (e.g., a trial version).

Figure 11:
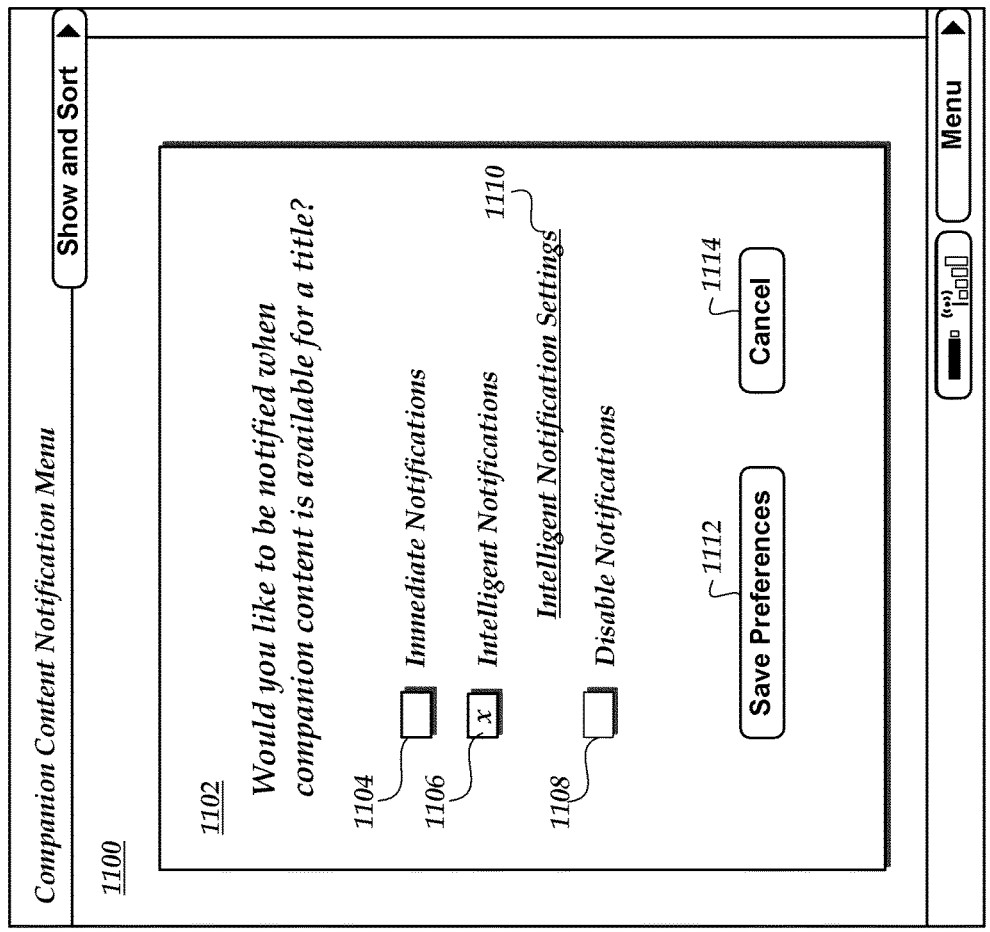
FIGS. 11 and 12 are illustrative user interfaces for selecting preferences regarding notifications of companion content.

FIG. 11 is an illustrative interface 1100 generated on a computing device 204, such as a computing device that can synchronously present companion content, for selecting options related to notifications of the availability of companion content. The interface 500 can include a first portion 1102 for presentation of options as to notifications for the availability of companion content. For example, input control 1104 may enable a user to specify that they desire to be immediately notified as to the availability of companion content. Illustratively, immediate notification may occur at any point a content match is identified between an item of content acquired by the user and an item of content not yet acquired by a user. As such, user selection of input control 1104 may enable a user to be immediately notified should a new item of companion content be identified. Input control 1106 may enable a user to specify that they desire notifications according to certain criteria (e.g., notification triggers), as well as according to user specified preferences. As such, user selection of input control 1106 may enable a user to be notified of the availability of companion content according to one or more notification triggers (e.g., switching between consumption of textual and audio content, enabling a text-to-speech function, reduced page turn rate, etc.). Notification triggers are discussed in more detail with respect to FIG. 10, above. The user interface portion 1102 may further enable user customization of preferences regarding notifications, such as by selection of input control 1110. User preferences for notifications trigger-based notifications will be discussed in more detail with reference to FIG. 12, below. Further, input control 1108 may enable a user to specify that they do not desire any notifications regarding companion content. As such, user selection of input control 1106 would allow the user to opt-out of all notifications. After selection of an input control 1104-1108, the user may save their preferences by selection of input control 1112, or discard their input by selection of input control 1114.

Figure 12:
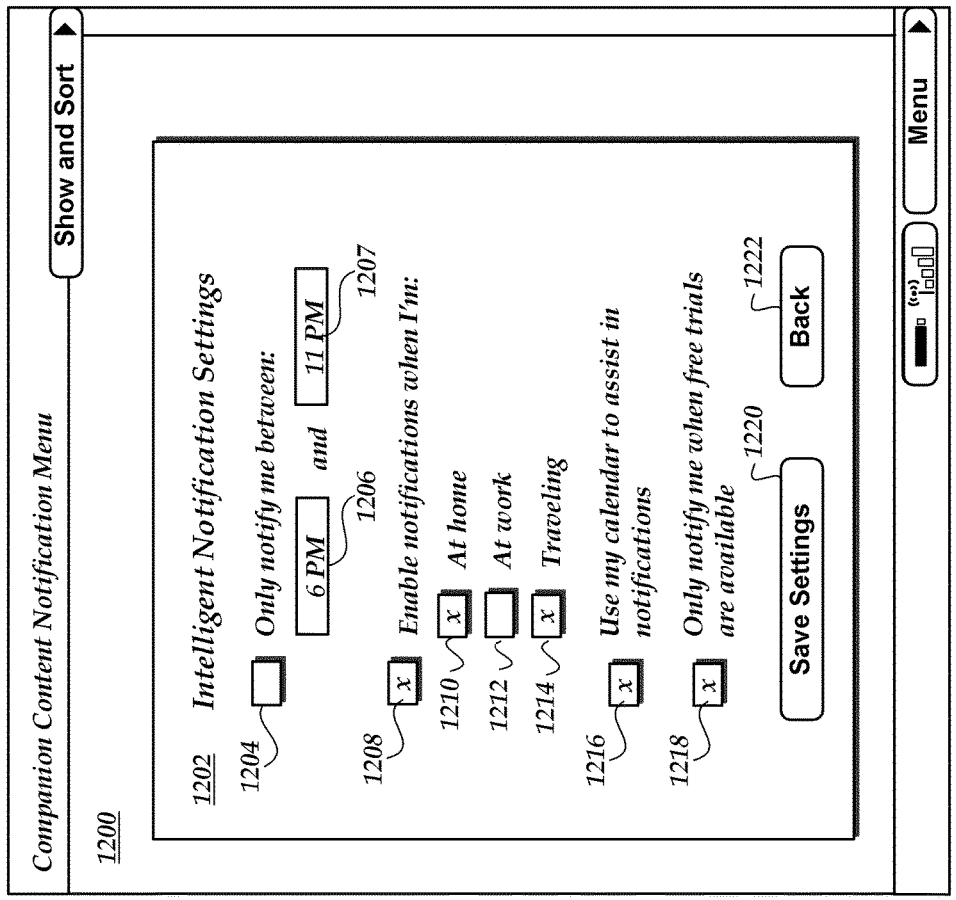

FIG. 12 is an illustrative interface 1200 generated on a computing device 204, such as a computing device that can synchronously present companion content, for selecting options related to notification trigger-based notifications. For example, the interface 1200 may be displayed based on user selection of input control 1110 of FIG. 11. The interface 1200 can include a first portion 1202 for enabling user selection of a number of preferences. One or more preferences may be utilized in order to determine notification triggers for transmitting notifications to the computing device 204. For example, input control 1204 may be selectable by a user to configure specific hours during which notifications may be transmitted. The specific range of hours may be input via input controls 1206 and 1207. For example, user selection of input control 1204 in the illustrative user interface displayed would allow notifications to be sent only between the hours of 6 PM and 11 PM.

Input control 1208 may enable a user to specify locations in which notifications may be transmitted. For example, input control 1208 may be associated with a number of additional input controls 1210-1214, each input control 1210-1214 corresponding to a defined location. In some embodiments, one or more of these locations may be user defined. In other embodiments, one or more of these locations may be predefined. For example, in the illustrative interface 1200, input control 1210 corresponds to "At home," input control 1212 corresponds to "At work," and input control 1214 corresponds to "Traveling." Selection of each of input control 1210-1214 may enable notifications to be transmitted while the computing device 204 is at the defined location. In some embodiments, preferences may be synchronized across a number of computing devices 204. In these embodiments, selection of each of input control 1210-1214 may enable notifications to be transmitted to any of the number of computing devices 204, while the device is within the defined location. A computing device 204 may determine its location by any number of inputs known to those skilled in the art, including, but not limited to global positioning systems (GPSs), wireless network location databases, and cellular triangulation.

Input control 1216 may be selectable by a user to enable interaction between the content management system 202 and a user's calendar or other data source. For example, the computing device 204 may include a calendar application that tracks user appointments or activities. In some embodiments, selection of input control 1216 may enable the content management system 202 to interact with a default calendar application. In other embodiments, selection of input control 1216 may enable the content management system 202 to interact with a specified calendar application. The information available within a user's calendar may be used to determine or modify a notification trigger. For example, a calendar may be used to determine a length of time until the user has an appointment. In some embodiments, a threshold amount of time before a next appointment may be required for a notification to be transmitted. Illustratively, a user may not desire to be notified that companion content exists (and potentially to try out the use of the companion content) when only five minutes remain until the users next appointment. In still more embodiments, a computing device 204 may be configured to determine a next appropriate time to notify the user of the availability of companion content. For example, a notification trigger may occur shortly before a user has an appointment. As such, the computing device 204 may delay displaying a notification to the user until a next appropriate time (e.g., when a user appears to have more time to consume companion content). As a further example, the user may not desire to be notified of available companion content when the user is marked as "do not disturb" according to their calendar. In some embodiments, a user may be able to specify custom rules for notifications based on calendar information, such as under what conditions the user should be notified of the availability of companion content.

In some embodiments, input controls may be presented that enable a user to limit the type of notifications presented. For example, input control 1218 may be selectable to limit notifications to those corresponding to offers for free trials of companion content. As will be described in more detail below with respect to FIG. 14, notifications may correspond to any number of offers to acquire companion content. In some instances, a notification may correspond to an offer for a free trial of companion content (e.g., limited in time or duration of consumption). In other instances, a notification may correspond to an offer to acquire a portion of companion content at a reduced rate (e.g., the portion corresponding to an unviewed or unheard portion of a first content). In still more instances, a notification may correspond to an offer to acquire the entirety of a companion content (e.g., at a standard rate). As such, input controls may be provided such that a user may specify the types of offers received in notifications. For example, user selection of input control 1218 may limit notifications to only those including offers for free trial of companion content.

After selection of one or more user preferences corresponding to input controls 1204-1218, the user may save their preferences by selection of input control 1112, or discard their input by selection of input control 1114. Though a number of illustrative user preferences are discussed with respect to FIG. 12, one skilled in the art will appreciate that a user may specify preferences corresponding to any aspect of notifications. For example, user preferences may control the applicability of individual notification triggers (e.g., disabling or enabling each notification trigger), as well as any available criteria for each notification trigger (e.g., thresholds for light level to trigger a notification, etc.).

Figure 13:
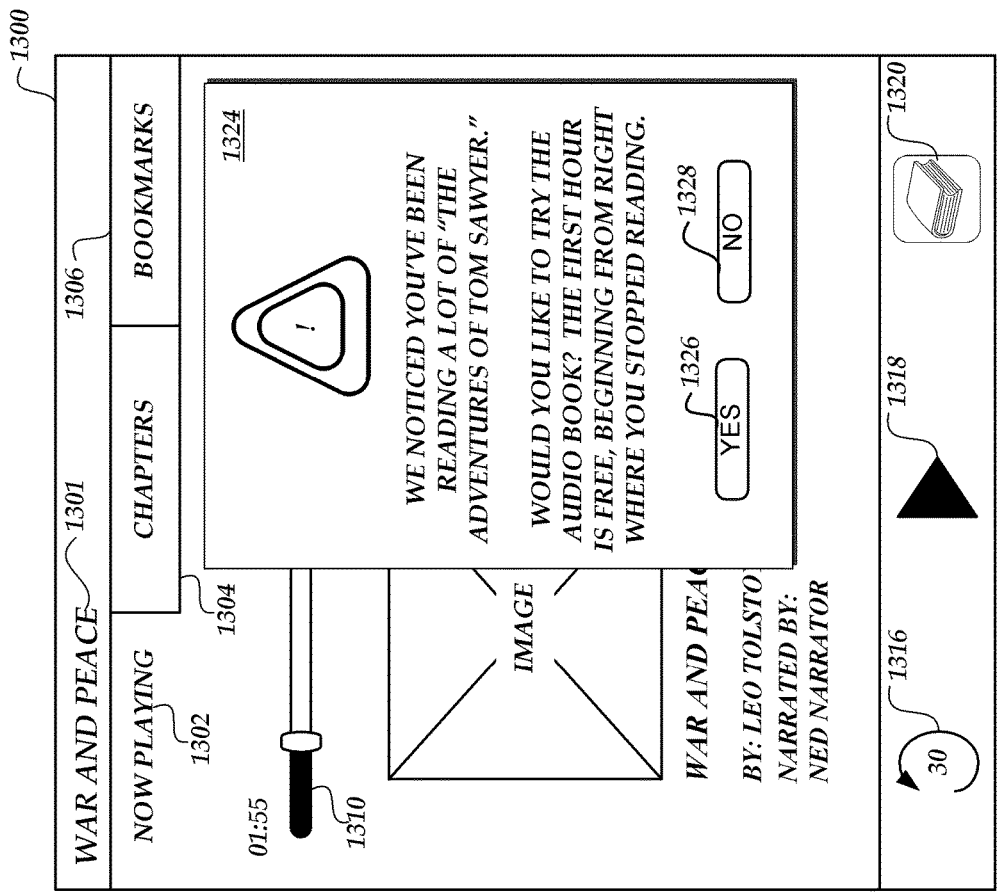
FIG. 13 is an illustrative user interface for presenting a companion content notification to a user in response to a notification trigger.

FIG. 13 is an illustrative interface 1300 generated on a computing device 204, such as a computing device that can synchronously present companion content, for displaying a notification regarding the availability of companion content. Illustratively, the interface 1300 may correspond to an application for playback of audio books. As such, the interface 1300 may include portions displaying the title of the currently playing audio book 1301; tabs 1302-1306 for displaying information regarding the audio book (e.g., a "Now Playing" screen, a "Chapters" screen, and a "Bookmarks" screen, respectively); a playback indicator 1310 indicating a current position of playback; and one or more playback controls 1316-1320 (e.g., to jump back in playback, to continue playback, and to view bookmarks, respectively). Though not discussed herein, the interface 1300 may include any number of additional display elements regarding a currently playing audio book.

In addition, the interface 1300 may be configured to display a notification 1324 regarding the availability of companion content. The notification 1324 may be displayed in response to a detection of a notification trigger, as described above with respect to FIG. 10. Illustratively, a user of the computing device 204 may have recently consumed a portion of the e-book of *The Adventures of Tom Sawyer*. Thereafter, the user may have loaded the user interface 1300 in order to listen to an audio book. As such, the computing device 204 may determine that the user would be interested in synchronously presenting the audio book version of *The Adventures of Tom Sawyer*. Accordingly, notification 1324 may be displayed. The notification 1324 may convey to the user that: (1) an audio book corresponding to an e-book the user has recently consumed is available for synchronous playback; and (2) the user may acquire a trial portion of the corresponding audio book at no charge, beginning from a point corresponding to the last read portion of the e-book.

The interface 1300 may include input controls 1326 enabling a user to accept or decline the offer included with the notification. For example, if the user were to select input control 1328, the notification may be removed, and the user may continue consuming a current audio book. However, if the user were to select input control 1326, the user may be provided with an audio book corresponding to *The Adventures of Tom Sawyer*, and may be enabled to immediately (or substantially immediately) begin playback of the audio book from a point corresponding to the last read point within the e-book. As will be described in more detail below with respect to FIG. 14, in order to facilitate such playback of the audio book, the computing device 204 may be provided with synchronization information related to the first content and the second content (e.g., the e-book and the audio book). Further, the computing device 204 may be provided with all or a portion of the second content (e.g., the audio book). Thereafter, synchronized playback of the first content and second content may proceed as described above with respect to FIGS. 4A-9.

Figure 14:
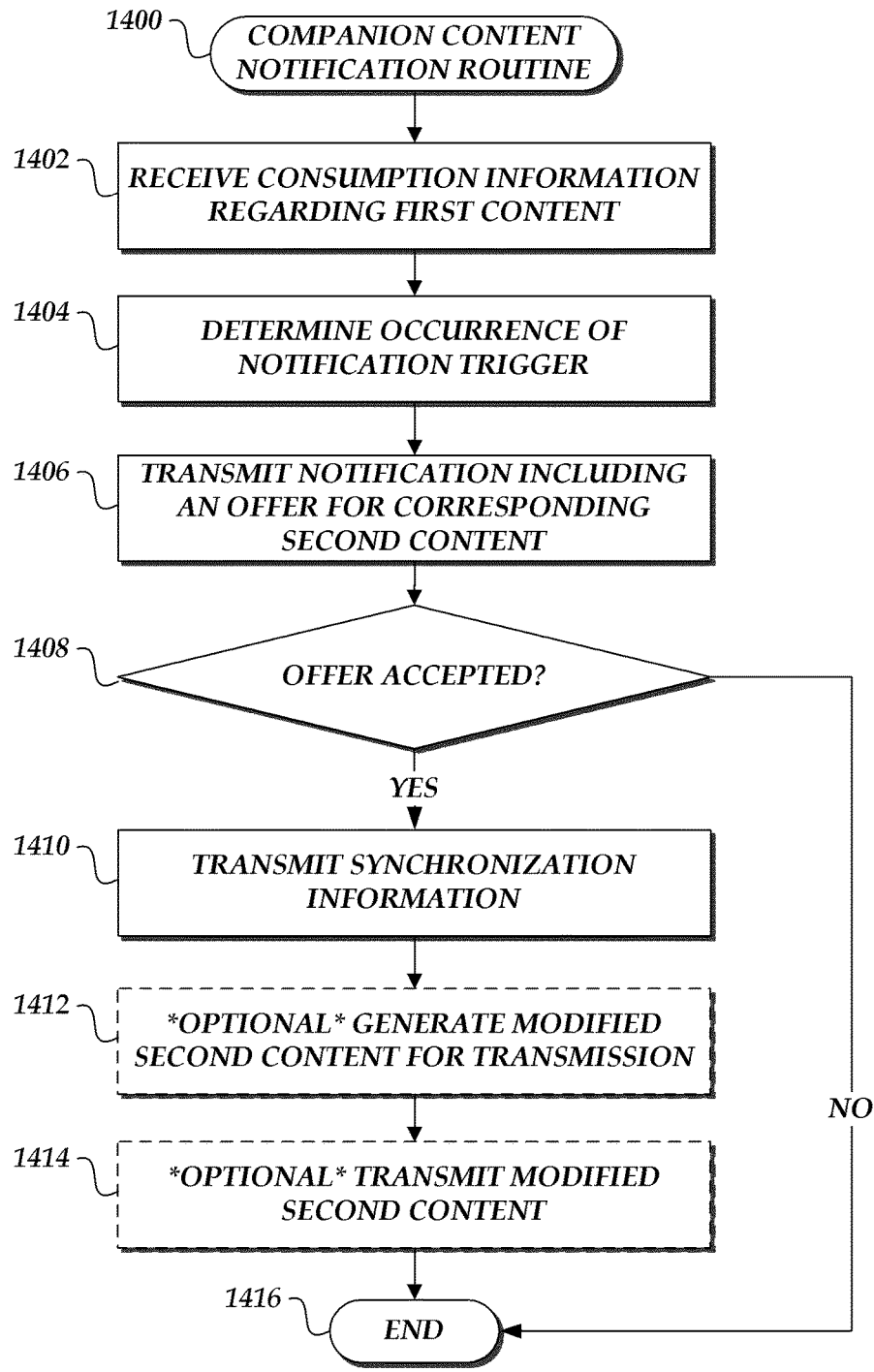
FIG. 14 is a flow diagram of an illustrative routine for determining a notification trigger and presenting a companion content notification to a computing device.

With reference to FIG. 14, a flow diagram depicting an illustrative routine 1400 for notifying a computing device, such as a computing device 204 of FIG. 2, of the availability of companion content will be described. For example, in some embodiments, the illustrative routine 1400 may be implemented by a content management system 202 of FIG. 2 (e.g., in communication with the computing device 204). In other embodiments, the routine 1400 may be implemented in part or in its entirety by the computing device 204, itself.

The routine 1400 may begin at block 1402, where the content management system 202 may receive consumption information regarding a first content (e.g., an e-book of *The Adventures of Tom Sawyer*). As described above with respect to FIG. 10, consumption information may include, but is not limited to, information regarding a position of consumption of the first content and information regarding the context of a user or a computing device 204 (e.g., specific user activity, rate of consumption, duration or frequency of consumption, ambient light or noise levels, rate of travel, location, etc.).

Thereafter, at block 1404, the content management system 202 may determine the occurrence of a notification trigger. A notification trigger may include any individual trigger criteria, or a combination of trigger criteria, as described in more detail above with respect to FIG. 10. In some embodiments, received consumption information may be used to determine the occurrence of a notification trigger.

In other embodiments, the computing device 204 may be configured to determine occurrences of notification triggers, and to transmit an indication of such a trigger to the content management system 202. As such, the determination of a notification trigger may correspond to receiving an indication from the computing device 204 that a notification trigger has occurred.

In response to a determination of a notification trigger, the content management system 202 may, at block 1406 transmit a notification to the computing device 204 corresponding to an offer to acquire a corresponding second content. In some embodiments, block 1406 may include determining the availability of a corresponding second content. Still further, in some embodiments, a determination of a second content may be based in part on the determined notification trigger. For example, a given notification trigger may indicate that the user has stopped reading, and would like to listen to an audio book. As such, a second content may be determined that corresponds to a recently read e-book, and that is available in audio format. Illustratively, the transmitted notification may enable a user to accept or decline the offer to acquire the second content. One example of a user interface including such a notification is described above with respect to FIG. 13.

In some embodiments, offers may be associated with various acquisition conditions for acquiring all or a portion of a second content. For example, in some embodiments, a portion of a second content may be offered for trial use, subject to usage restrictions. Usage restrictions may correspond, for example, to a limited time of use (e.g., use over only a given time frame, or use for a given period). One skilled in the art will recognize that various additional usage restrictions may exist. For example, use of a second content may be limited to a single "session" (e.g., a continuous period of use). As a further example, use of a second content may be limited to a single device, a single location, etc.

In other embodiments, all or a portion of a second content may be provided for a purchase amount. For example, in some embodiments, a second content may be offered, via a notification, for the same price that it would otherwise be offered for separately. In other embodiments, a purchase price may be dependent on current consumption information of the first content. For example, a customer may have previously consumed 50% of a first content (e.g., an e-book of *The Adventures of Tom Sawyer*). The user may wish to continue consuming the content in audio format, but may also wish to avoid purchasing the first 50% of the content again. As such, the audio content corresponding to *The Adventures of Tom Sawyer* may be offered to the user at half price, reflecting that the user is only acquiring access to the remaining 50% of content (or whatever percentage of the audio content corresponds to the last 50% of the e-book content). In still more embodiments, a user may acquire a second content according to a per-use fee. For example, the user may be charged based on the amount of content actually consumed. Illustratively, a user that consumes a small portion of the second content but then halts consumption of the content may only be charged for the portion consumed. One skilled in the art will appreciate that any number of fees or licenses may be associated with acquisition of a second content. As such, any fee or license, or combination thereof, may be associated with a transmitted notification.

After transmission of a notification including an offer to a user, a determination may be made as to whether a user has accepted the offer associated with the notification. If the user declines the offer, the routine 1400 may terminate at block 1416. However, if the user accepts the offer, the routine 1400 may continue at block 1410. Specifically, at block 1410, synchronization information corresponding to the second content may be transmitted to the computing device 204. Synchronization information may have been determined, for example, by the companion identification system 100 of FIG. 1, as described in more detail above. Illustratively, the synchronization information may enable to the computing device 204 to synchronously present the second content with the first, previously consumed content. For example, the computing device 204 may begin playback of the second content from a point corresponding to a last consumed position of the first content.

Optionally, at blocks 1412 and 1414, a portion of the second content may be generated and transmitted to the computing device 204. For example, the previously transmitted notification may correspond to an offer to acquire a limited portion of the second content (e.g., for trial use) subject to usage restrictions. As such, at block 1412, the content management system 202 may generate a modified second content including the limited portion. Further, in some embodiments, the content management system 202 may modify the second content in order to enforce usage restrictions (e.g., a limited duration of playback). In other embodiments, usage restrictions may be enforced through other mechanisms, such as through other functions on the computing device 204. At block 1414, the modified second content may be transmitted to the computing device 204, therefore enabling the computing device 204 to synchronously present the first content and the modified second content.

In some embodiments, the computing device 204 may be configured to stream all or a part of the second content (e.g., from the content management system 202). As such, in these embodiments, either or both of blocks 1412 and 1414 may be non-essential, and thus omitted. For example, the content management system 202 may enable the computing device 204 to stream only a trial portion of the second content, therefore negating the requirement that the second content be modified. In still other embodiments, the computing device 204 may be configured to both stream the second content and to download the second content. For example, the computing device 204 may initially stream the second content (e.g., in order to facilitate immediate playback), while downloading the second content for non-streaming playback at a later time. Accordingly, after receiving the second content, as well as synchronization information regarding the first content and the second content, the computing device 204 may enable a user to synchronously playback the first and second content, as described in more detail above.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware, or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements, and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for providing synchronized content, the computer-implemented method comprising:
    under control of one or more computing devices configured with specific executable instructions,
    obtaining content synchronization information for synchronizing presentation of a first content of a first format and a second content of a second format, wherein the content synchronization information indicates at least one disparity in substance between the first content and second content, and wherein the first content obtained separately from the second content;
    determining that a user has halted consumption of the first content using a consuming computing device;
    determining that the user has begun consumption using the consuming computing device of a third content of the second format within a predefined period of time after determining that a user has halted consumption of the first content using the consuming computing device;
    transmitting a notification to a computing device associated with the user indicating the availability of the second content, the notification corresponding to an offer to acquire the second content;
    receiving an acceptance of the offer by the user;
    determining at least a portion of the second content based at least in part on the content synchronization information and a halt position of user within the first content; and
    transmitting the determined at least one portion of the second content to the computing device associated with the user.

2. The computer-implemented method of claim 1, wherein the first content comprises an e-book, wherein the second content comprises an audio book corresponding to the e-book, and wherein the third content comprises an audio book that does not correspond to the e-book.

3. The computer-implemented method of claim 1, wherein the consuming computing device and the computing device associated with the user are the same device.

4. The computer-implemented method of claim 1, wherein the portion of the second content corresponds to an unconsumed portion of the first content.

5. The computer-implemented method of claim 1, wherein the portion of the second content corresponds to a trial portion of the second content comprising less than all unconsumed portions of the first content.

6. The computer-implemented method of claim 1, wherein the portion of the second content is associated with usage restrictions.

7. The computer-implemented method of claim 1, wherein the usage restrictions correspond to at least one of a maximum playback time of the second content, a period of time during which the second content is accessible, and maximum number of times a second content can be consumed.

8. The computer-implemented method of claim 1 further comprising:
    receiving a set of user preferences regarding transmission of notifications to the computing device associated with the user, and
    determining that transmitting the notification is in accordance with the set of user preferences.

9. A system for providing synchronized content, the system comprising:
    at least one data store configured to store information regarding a first content that can be synchronized with a second content, wherein the first content is obtained separately from the second content; and
    one or more processors configured to:
        determine an occurrence of a user notification trigger, wherein the user notification trigger indicates that a user may be interested in acquiring the second content;
        in response to the occurrence of the notification trigger, transmit a notification indicating the availability of the second content to the user, the notification corresponding to an offer for at least a portion of the second content;
        receive an acceptance of the offer by the user;
        obtain content synchronization information for synchronizing presentation of the first content and the second content, wherein the content synchronization information indicates at least one disparity in substance between the first content and second content; and
        provide the content synchronization information to a consuming computing device associated the user in order to enable synchronized presentation of the first content and the second content to the user by the consuming computing device.

10. The system of claim 9, wherein the notification trigger comprises at least one of: halting consumption of the first content, and beginning consumption of a third content of a format corresponding to the format of the second content; initiating a format altering function with respect to the first content; and detecting a change in context of a the consuming computing device associated with the user.

11. The system of claim 8, wherein the context of the device of the user comprises to at least one of: a location, a speed, a font size, a volume, an output capability, an ambient light level, and an ambient noise level.

12. The system of claim 9, wherein determination of a notification trigger is based at least in part on at least one of a purchase history of the user, a purchase history rate of the user, the user's prior responses to one or more prior notifications, and demographic information regarding the user.

13. The system of claim 9, wherein the portion of the second content is determined based at least in part on a last position of consumption of the base content by the user.

14. The system of claim 9, wherein offer is associated with payment of a fee by the user.

15. The system of claim 14, wherein the fee corresponds to at least one of a fixed fee, a fee based at least in part on the size of the portion of the second content relative to the entire second content, or a fee based at least in part on an amount of the second content consumed by a user.

16. The system of claim 9, wherein the one or more processors are further configured to:
receive a set of user preferences regarding transmission of notifications; and
determine that transmission of the notification is in accordance with the set of user preferences.

17. The system of claim 16, wherein the set of user preferences specify at least one of a location of the user in which notifications may be transmitted, a time during which notifications may be transmitted, and a maximum fee associated with a transmitted notification.

18. The system of claim 9, wherein the one or more processors are further configured to determine a time to transmit the notification based at least in part on a calendar of the user.

19. The system of claim 9, wherein the one or more processors are included within the consuming computing device associated with the user.

20. A computer-readable, non-transitory storage medium having at least one computer-executable module for providing synchronized content, the at least one computer-executable module comprising:
a companion content notification module configured to:
determine an occurrence of a notification trigger corresponding to a first content, wherein the notification trigger is associated with an offer to acquire at least a portion of a second content that can be synchronized with the first content, and wherein the second content is obtained separately from the first content;
in response to the occurrence of the notification trigger, electronically transmit the offer to the user;
electronically receive an acceptance of the offer by the user;
obtain content synchronization information for synchronizing presentation of the first content and the second content, wherein the content synchronization information indicates at least one disparity in substance between the first content and second content;
provide the content synchronization information to a consuming computing device associated the user in order to enable synchronized presentation of the first content and the second content to the user by the consuming computing device.

21. The computer-readable, non-transitory storage medium of claim 20, wherein the portion of the second content corresponds to a trial portion of the second content associated with a maximum duration of consumption of the portion of the second content by the user.

22. The computer-readable, non-transitory storage medium of claim 20, wherein the notification trigger is determined based at least in part on a set of user preferences.

23. The computer-readable, non-transitory storage medium of claim 20, wherein the portion of the second content is associated with usage restrictions.

24. The computer-readable, non-transitory storage medium of claim 20, wherein the usage restrictions comprise at least one of a maximum playback time of the second content, a period of time during which the second content is accessible, and maximum number of times a second content can be consumed.

25. The computer-readable, non-transitory storage medium of claim 20, wherein the notification trigger comprises at least one of: halting consumption of the first content, and beginning consumption of a third content of a format corresponding to the format of the second content; initiating a format altering function with respect to the first content; and detecting a change in context of the consuming computing device.

26. The computer-readable, non-transitory storage medium of claim 20, wherein the context of the device of the user comprises to at least one of: a location, a speed, a font size, a volume, an output capability, an ambient light level, and an ambient noise level.

27. The computer-readable, non-transitory storage medium of claim 20, wherein determination of a notification trigger is based at least in part on at least one of a purchase history of the user, a purchase history velocity of the user, the user's prior responses to one or more prior notifications, and demographic information regarding the user.

* * * * *